US010465919B2

(12) United States Patent
O'Connor et al.

(10) Patent No.: US 10,465,919 B2
(45) Date of Patent: Nov. 5, 2019

(54) MODULAR TRACK WIRING ASSEMBLY FOR A HYDRONIC SYSTEM

(71) Applicant: B2 Products Ltd., Victoria (CA)

(72) Inventors: Brendan A. O'Connor, Victoria (CA); Brad Bunt, Victoria (CA)

(73) Assignee: B2 Products Ltd., Victoria, BC (CA)

( * ) Notice: Subject to any disclaimer, the term of this patent is extended or adjusted under 35 U.S.C. 154(b) by 886 days.

(21) Appl. No.: 14/811,553

(22) Filed: Jul. 28, 2015

(65) Prior Publication Data
US 2017/0030593 A1 Feb. 2, 2017

(51) Int. Cl.
| F24D 19/10 | (2006.01) |
| F24D 3/02 | (2006.01) |
| F24D 3/08 | (2006.01) |
| G05D 23/19 | (2006.01) |
| H01R 25/14 | (2006.01) |

(52) U.S. Cl.
CPC .......... *F24D 19/1015* (2013.01); *F24D 3/02* (2013.01); *F24D 3/08* (2013.01); *F24D 19/10* (2013.01); *F24D 19/1012* (2013.01); *F24D 19/1048* (2013.01); *G05D 23/1934* (2013.01); *H01R 25/14* (2013.01); *H01R 25/142* (2013.01); *Y02B 30/745* (2013.01); *Y02B 30/762* (2013.01)

(58) Field of Classification Search
CPC ..... F24D 19/10; F24D 19/1015; H01R 25/14; H01R 25/152
USPC .......................................................... 237/8 A
See application file for complete search history.

(56) References Cited

U.S. PATENT DOCUMENTS

| 2,928,998 A | 3/1960 | Brumfield |
| 3,698,432 A * | 10/1972 | Kutz .................. F15B 13/0814 137/271 |
| 4,445,567 A | 5/1984 | Nelson |
| 4,516,189 A | 5/1985 | Seaks, Jr. |
| 4,762,508 A | 8/1988 | Tengler et al. |
| 4,790,766 A | 12/1988 | Booty, Sr. et al. |

(Continued)

FOREIGN PATENT DOCUMENTS

| EP | 1113231 | 7/2001 |
| EP | 1156285 | 11/2001 |

(Continued)

OTHER PUBLICATIONS

European Search Report for European Patent Application No. EP16181595.6, dated Feb. 3, 2017.

*Primary Examiner* — Kenneth Rinehart
*Assistant Examiner* — Phillip Decker
(74) *Attorney, Agent, or Firm* — Cameron IP

(57) ABSTRACT

There is provided a hydronic system for a plurality of zones. The system includes a wiring track. The track has a pair of power conductors for supplying electrical energy therealong and a pair of signal conductors. The signal conductors are in communication with a heat/cold source. The system includes a plurality of zone modules, each corresponding to a respective one of the zones. Each of the zone modules includes leads which connect to respective ones of the conductors. Each of the zone modules includes terminals and conductors configured to selectively connect respective thermostats and zone valves of their zone together, receives signals therefrom and conveys the signals via the signal conductors to the heat/cold source for selectively heating/cooling respective ones of the zones.

9 Claims, 32 Drawing Sheets

(56) References Cited

U.S. PATENT DOCUMENTS

| | | | |
|---|---|---|---|
| 4,918,258 | A | 4/1990 | Ayer |
| 5,131,860 | A | 7/1992 | Bogiel |
| 5,318,104 | A | 6/1994 | Shah et al. |
| 5,329,431 | A | 7/1994 | Taylor et al. |
| 5,356,316 | A | 10/1994 | Anderson |
| 5,622,221 | A | 4/1997 | Genga, Jr. et al. |
| 6,186,471 | B1 * | 2/2001 | Genga .................. F16K 31/046 251/129.12 |
| 6,467,537 | B1 * | 10/2002 | Bujak, Jr. ................ F24F 3/06 165/209 |
| 6,622,925 | B2 | 9/2003 | Carner et al. |
| 7,284,710 | B2 * | 10/2007 | Rixen ..................... F23N 3/08 237/12.3 B |
| 7,329,131 | B1 | 2/2008 | Chen |
| 8,371,863 | B1 | 2/2013 | Ganta et al. |
| 8,577,507 | B2 | 11/2013 | Milder et al. |
| 8,714,989 | B2 | 5/2014 | Keswani et al. |
| 2007/0187521 | A1 | 8/2007 | Wawak |
| 2008/0179416 | A1 | 7/2008 | Johnson et al. |
| 2008/0223943 | A1 | 9/2008 | Mulhouse et al. |
| 2011/0019980 | A1 | 1/2011 | Harper |
| 2012/0180986 | A1 | 7/2012 | Mathews |
| 2014/0048244 | A1 | 2/2014 | Wallace |
| 2014/0113503 | A1 | 4/2014 | Barber et al. |

FOREIGN PATENT DOCUMENTS

| | | |
|---|---|---|
| FR | 2325221 | 4/1977 |
| WO | 03090001 | 10/2003 |
| WO | 2010111114 | 9/2010 |

* cited by examiner

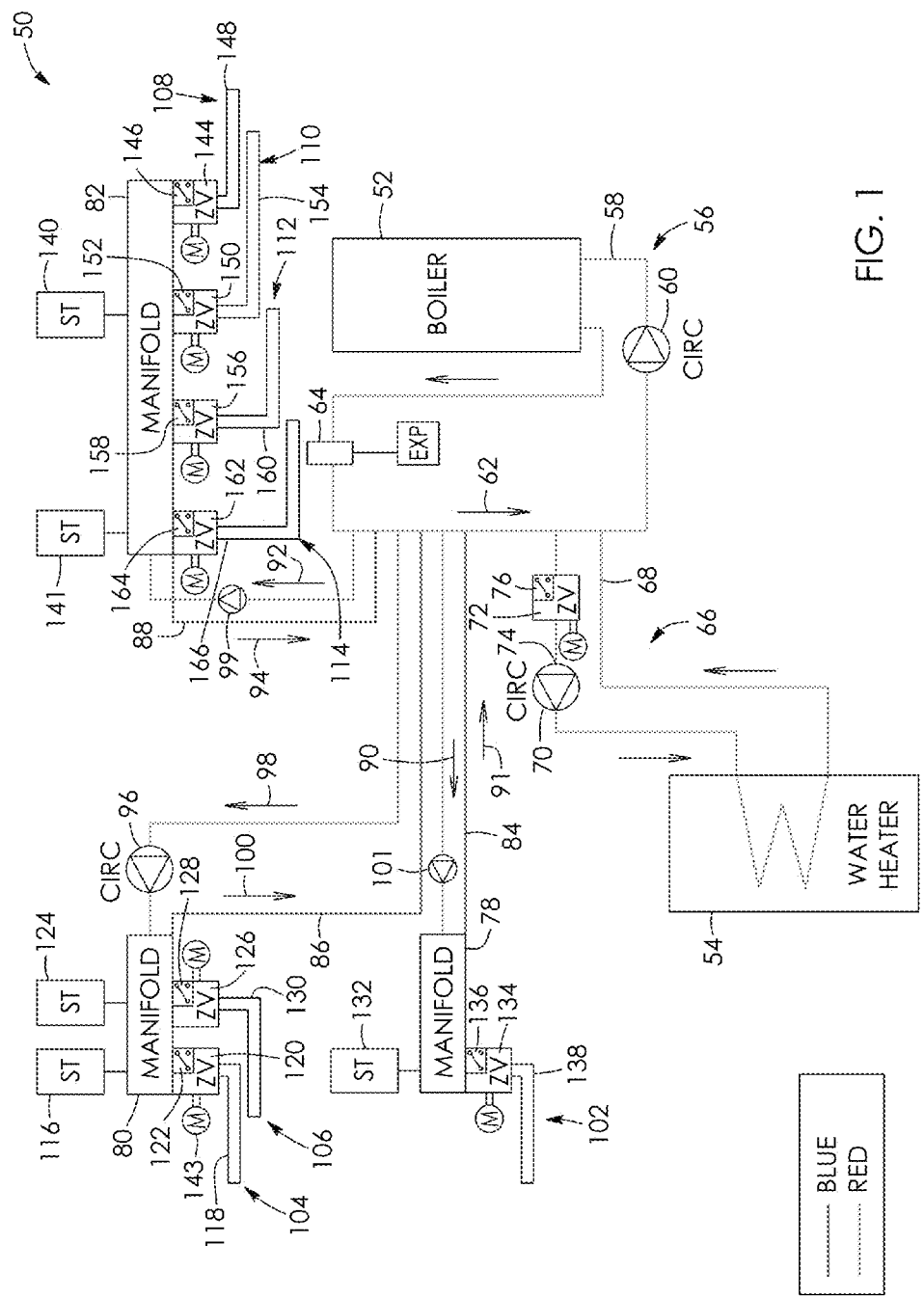

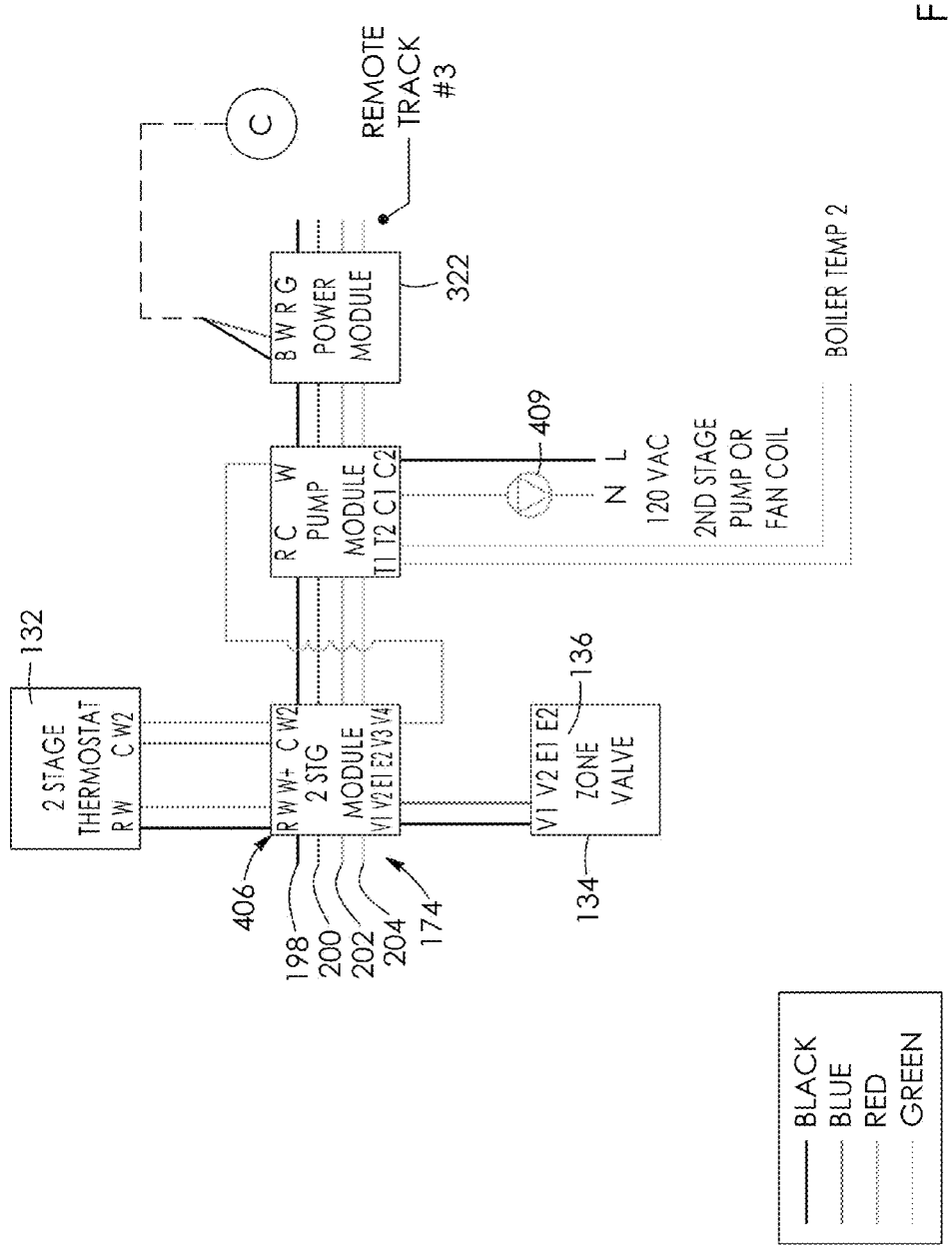

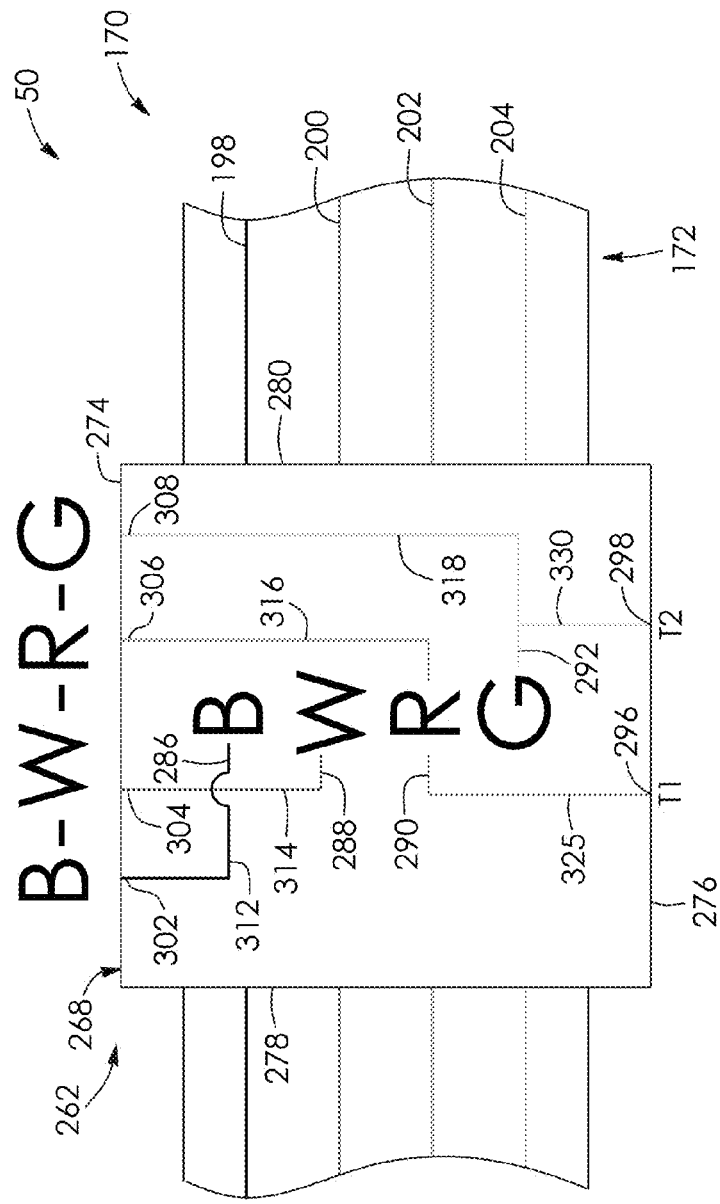
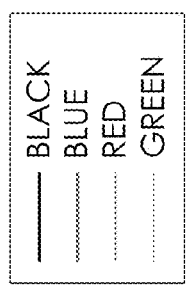
FIG. 10

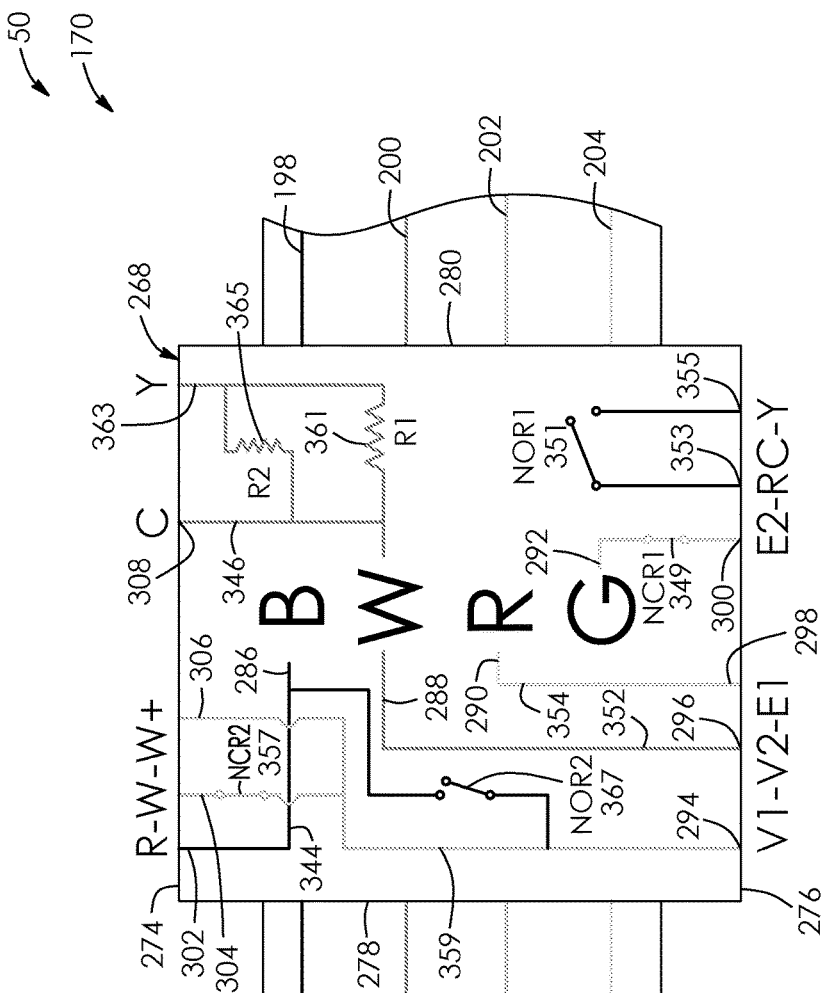
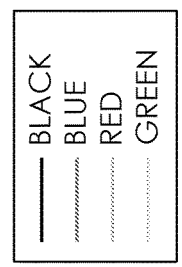
FIG. 25

MODULAR TRACK WIRING ASSEMBLY FOR A HYDRONIC SYSTEM

BACKGROUND OF THE INVENTION

Field of the Invention

There is provided a modular track wiring assembly. In particular, there is provided a modular track wiring assembly for a hydronic system.

Description of the Related Art

Multi-zone hydronic systems may comprise a number of interrelated components: a source of heat (typically a boiler), circulation pumps to move water around the system, and heat output emitters (radiators, radiant heating panels, fan coil units), zone control valves and thermal or mechanical controls (thermostats, aquastats, switches). A complete system will usually be made up of one or more heat sources, one or more circulation pumps and a number of heat output devices and emitters located at various locations where heat is needed throughout the building.

To maintain desired space temperatures, a plurality of thermostats are often installed. Each thermostat works to turn on and off the flow of hot water through one or more of the heat output emitters within its zone of control. If a zone calls for heat, two things typically must happen: 1) the correct zone valve must open in the hot water heating loop; and 2) the correct hot water circulation pump must start and drive hot water around the piping system. To accomplish this, each zone control valve is equipped with a built in end switch that is wired through a series of interconnections to the circulation pump and ultimately the heat source.

These systems typically operate on 24V AC control voltage and they are typically wired by installers who have training in such systems. To wire multi-zone hydronic systems together in an error free manner requires that the installer wire together a multitude of electrical devices: zone thermostats, zone hot water control valves including corresponding end switches, and one or more circulation pumps, for example. These components are wired into the system's low voltage transformer and also the building's electrical system. In addition to this, there are electrical controls on each heat source (such as the boiler, water heater etc.) to maintain correct use temperatures thereof. The complexity and non-uniformity of existing control systems may lead to wiring errors and poor electrical connections that can result in the need for post-installation service. Such servicing may be very difficult because poor installations are often disorganized and troubleshooting thus may be challenging.

In view of the above, there may accordingly be a need for an improved means for connecting together the various components of hydronic systems.

BRIEF SUMMARY OF INVENTION

There is provided a modular track wiring assembly for hydronic systems disclosed herein that may overcome the above disadvantages.

There is accordingly provided a modular track wiring assembly for a hydronic system. A first zone of the system includes a temperature-sensing device which outputs a valve-actuation signal upon the zone temperature deviating from a threshold temperature range. The system includes a zone valve having an end switch which outputs a call for heat/cold signal when the zone valve is fully open. The assembly includes an elongate track. The track has a pair of power conductors extending therealong. The power conductors are configured to supply electrical energy. The track has a pair of signal conductors extending therealong. The signal conductors are configured to convey signals therealong. The assembly includes a zone module connectable to and receiving electrical energy from the track. The zone module connects the temperature-sensing device to the zone valve such that the zone valve is powered to open upon receiving the valve-actuation signal. The zone module connects the end switch to the signal conductors for conveying a call for heat/cold signal therealong when the zone valve is fully open.

According to another aspect, there is provided a hydronic system for a plurality of zones. The system includes a wiring track. The track has a pair of power conductors for supplying electrical energy therealong and a pair of signal conductors. The signal conductors are in communication with a heat/cold source. The system includes a plurality of zone modules, each corresponding to a respective one of the zones. Each of the zone modules includes leads which connect to respective ones of the conductors. Each of the zone modules includes terminals and conductors configured to selectively connect respective thermostats and zone valves of their zone together, receives signals therefrom and conveys said signals via the signal conductors to the heat/cold source for selectively heating/cooling respective ones of said zones.

According a further aspect, there is provided a modular track for a hydronic system. The track is elongate and planar. The track includes a pair of spaced-apart power conductors for supplying electrical energy therealong. The power conductors are connectable to an electrical power source. The track includes a pair of signal conductors configured to receive mechanical or thermal control signals from a plurality of zones and convey the signals to a heat/cold source actuator.

BRIEF DESCRIPTION OF DRAWINGS

The invention will be more readily understood from the following description of preferred embodiments thereof given, by way of example only, with reference to the accompanying drawings, in which:

FIG. 1 is a schematic view of a hydronic system according to one aspect, with heating circuits not being shown for clarity;

FIG. 2A to 2D are an example of a schematic wiring diagram for the hydronic system of FIG. 1, the system including a plurality of modular tracks and a plurality of modules connected thereto;

FIG. 10 is an internal schematic wiring diagram of one of the power modules of the hydronic system of FIGS. 2A to 2D;

FIG. 25 is an internal schematic wiring diagram of a heat/cool module for the hydronic system of FIG. 1;

DESCRIPTION OF THE PREFERRED EMBODIMENTS

Figure 2A:
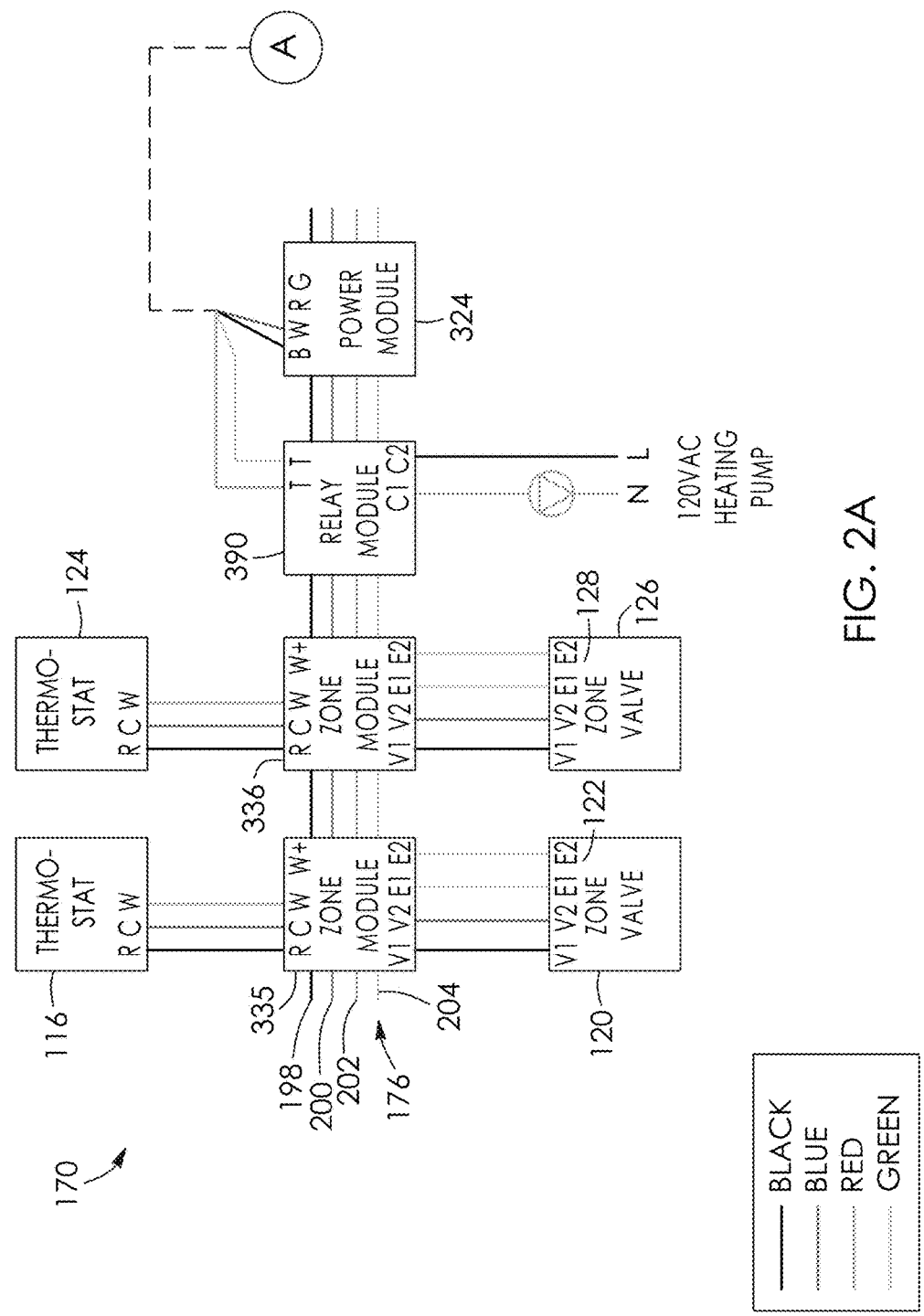
Figure 2B:
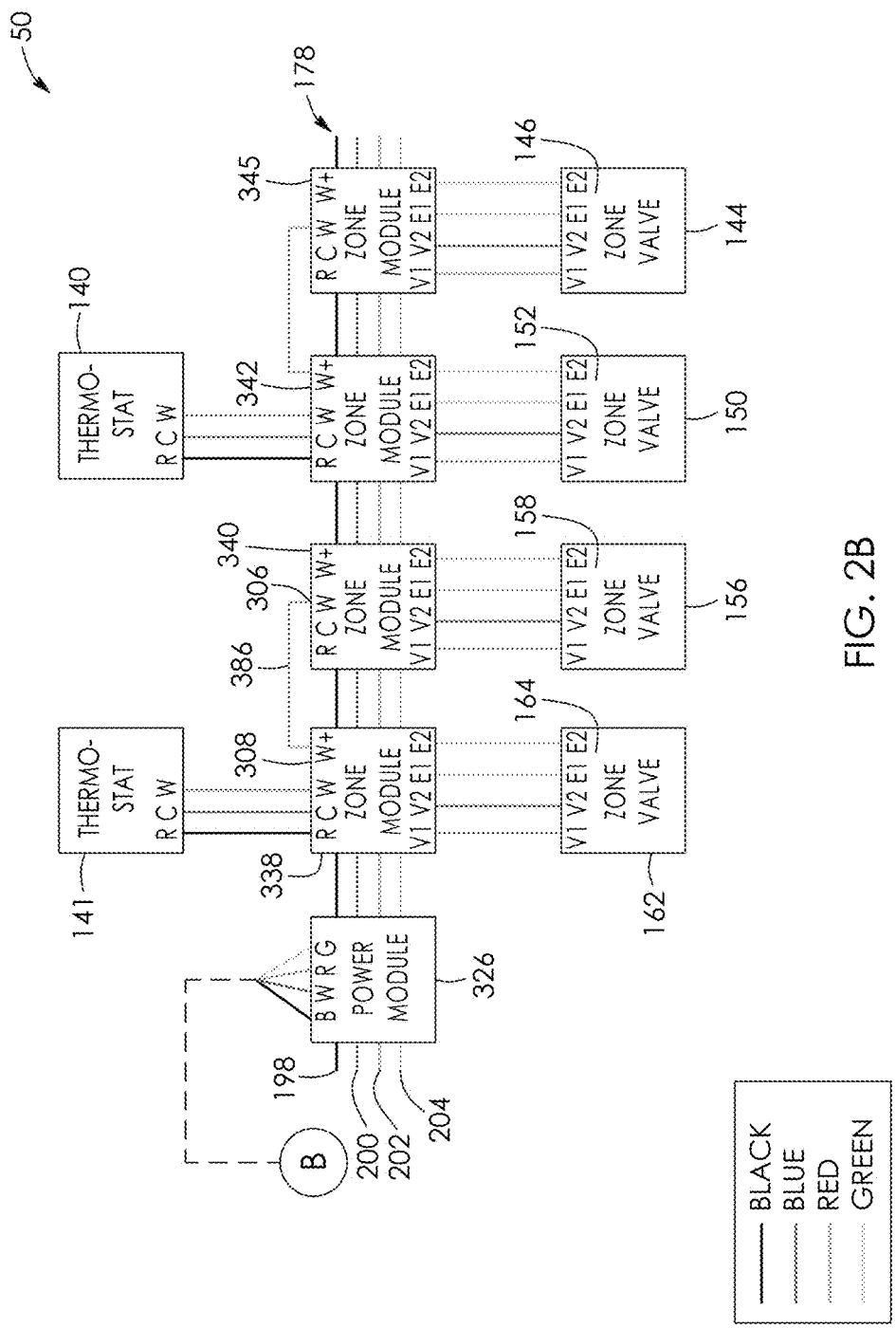
Figure 2D:
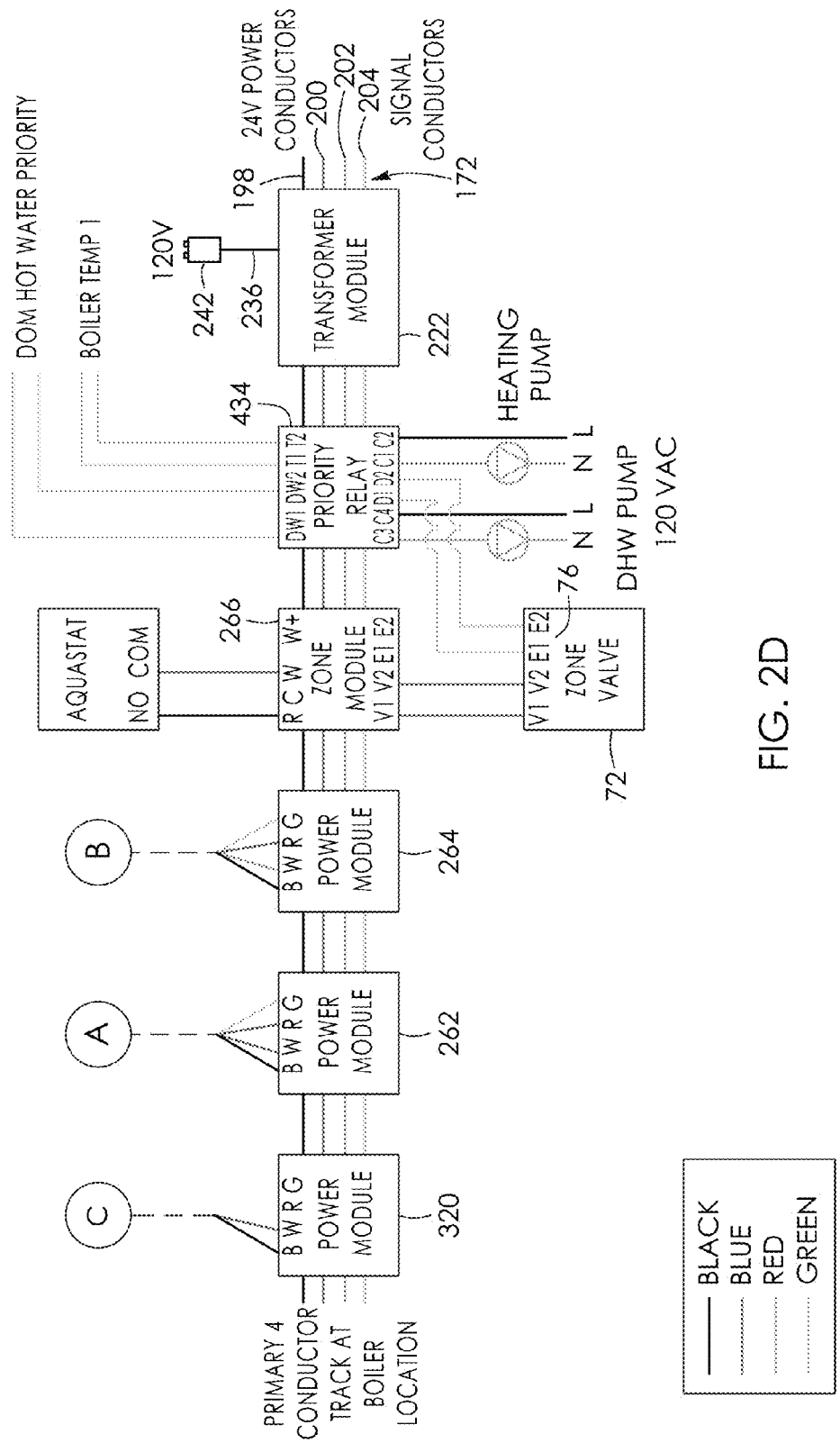

Referring to the drawings and first to FIG. 1, there is shown a schematic view of a multi-zone hydronic system 50 according to one aspect, with the wiring circuits not being shown.

Water for domestic use is heated indirectly via a coil inside a fluid heater in the form of a water heater 54 in this example. The system includes a central fluid circuit 56 comprising a central fluid loop, in this example a central water loop 58 through which water may be circulated. The central water loop is in communication with the boiler 52 for selectively heating the fluid therein. The central fluid circuit includes a circulation pump 60 which when activated circulates fluid into and out of the boiler for heating said fluid, as generally shown by arrow of numeral 62. The central fluid circuit 56 includes an air separator 64 configured to remove air from the central water loop 58.

The hydronic system 50 includes a water heater fluid circuit 66 that includes an auxiliary fluid loop, in this example in the form of a water loop 68 through which water may selectively circulate. Water loop 68 is in fluid communication with and extends from central water loop 58. The water heater fluid circuit 66 includes a circulation pump 70 which when activated circulates fluid into and out of the coil in water heater 54 for selectively heating the fluid therein. The fluid circuit 66 further includes a zone valve 72 interposed between inlet 74 of pump 70 and water loop 58. The pump and zone valve are thus aligned in series along loop 58 in this example. The zone valve 72 includes an end switch 76 operatively connected thereto and which is configured to output a signal upon determining that the valve is fully open.

The hydronic system 50 includes a plurality of manifolds 78, 80 and 82 and a plurality of additional auxiliary fluid loops, in this example water loops 84, 86 and 88 in communication with and coupling together the respective ones of the manifolds with the central water loop 58. Each of the loops is configured to enable water to circulate therewithin. In this example the system 50 includes an additional circulation pump 96 associated with loop 86 and configured to aid circulation of fluid heated from the boiler within loop 86, as generally shown by arrows of numerals 98 and 100. In this example the system 50 includes an additional circulating pump 99 associated with loop 88 and configured to aid circulation of fluid heated from the boiler 52 within loop 88. This is generally shown by arrows of numerals 92 and 94. In this example the system 50 includes an additional circulating pump 101 associated with loop 84 and configured to aid circulation of fluid heated from the boiler 52 within loop 84. This is generally shown by arrows of numerals 90 and 91.

The system includes a plurality of zones 102, 104, 106, 108, 110, 112 and 114 of a building (not shown) to be heated/cooled. Each of the zones includes a temperate-sensing device associated with it which determines when heat/cold is needed, a zone fluid loop in fluid communication with its respective manifold, a zone valve interposed between the zone fluid loop and manifold, and an end switch associated with the zone valve and which sends a signal when the zone valve is fully open. This is shown for example by thermostat 116, zone fluid loop 118, zone valve 120, and end switch 122 for zone 104 and manifold 80. Similarly, thermostat 124, zone valve 126, end switch 128, and zone fluid loop 130 are associated with zone 106 and manifold 80.

Thermostats/aquastats as herein described may be referred to as temperature set-point switches which close upon a zone temperature reaching above or below a certain threshold temperature as desired.

Thermostat 132 of zone 102 is a two-stage thermostat in this example and is associated with zone valve 134, end switch 136 and zone fluid loop 138 of zone 102 and is associated with manifold 78.

Thermostats 140 and 141 are configured to be shared by zones 108 and 110, and zones 112 and 114, respectively, in this example. Zone valve 144, end switch 146 and zone fluid loop 148 of zone 108 are associated with thermostat 140 and are associated with manifold 82. Zone valve 150, end switch 152 and zone fluid loop 154 of zone 110 are associated with thermostat 140 and are associated with manifold 82. Zone valve 156, end switch 158 and zone fluid loop 160 of zone 112 are associated with thermostat 141 and are associated with manifold 82. Zone valve 162, end switch 164 and zone fluid loop 166 of zone 114 are associated with thermostat 141 and are associated with manifold 82.

Each of the zone valves includes a zone valve motor configured to selectively open the valve upon receiving power thereto, as shown in FIG. 1 by zone valve motor 143 operatively connected to zone valve 120.

Zone valves, zone valve motors, end switches, thermostats, fluid loops, circulation pumps, water heaters and boilers per se, including their various parts and functionings, are well-known to those skilled in the art and therefore will not be described in further detail.

As seen in FIGS. 2A to 2D, the hydronic system 50 includes a modular track wiring assembly 170. The assembly includes a plurality of elongate tracks including a primary track 172 and a series of remote tracks, in this example tracks 174, 176 and 178. The primary track may be situated adjacent to the equipment location of a building, such as adjacent to boiler 52 seen in FIG. 1 for example. The remote tracks 174, 176 and 178 may be added as necessary to auxiliary locations throughout the building, generally at locations of manifolds 78, 80 and 82, seen in FIG. 1, for radiant floor heating, or central distribution points for example. Each of the tracks 172, 174, 176 and 178 is substantially the same in shape and parts and thus only track 172, best seen in FIGS. 3 to 6, will be described in detail.

Figure 3:
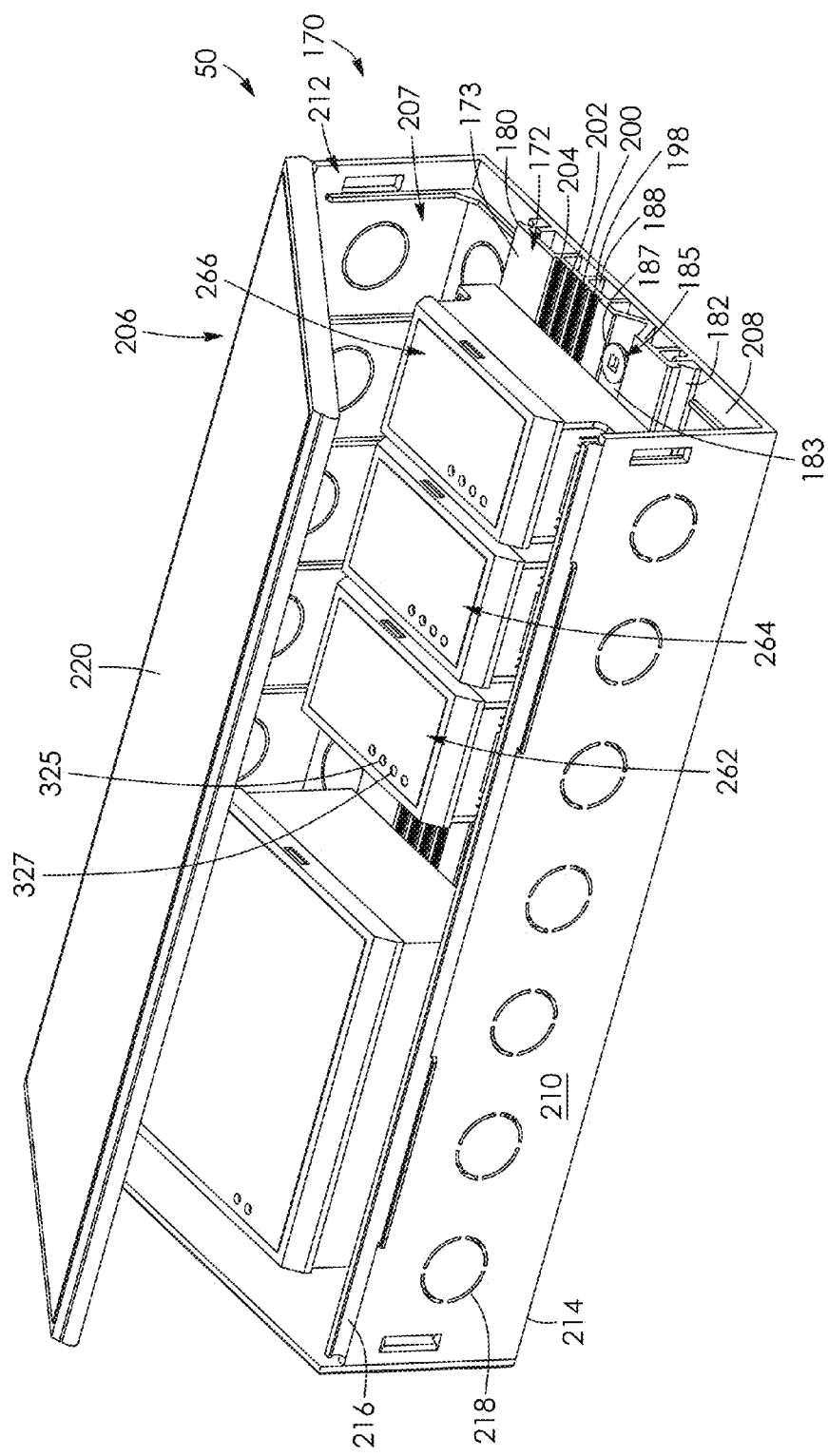
FIG. 3 is a front, top perspective, partially fragmented view of one of the tracks of FIGS. 2A to 2D together with a series of modules connected thereto, the track and the modules being enclosed within a housing having a cover that is partially open.
Figure 5:
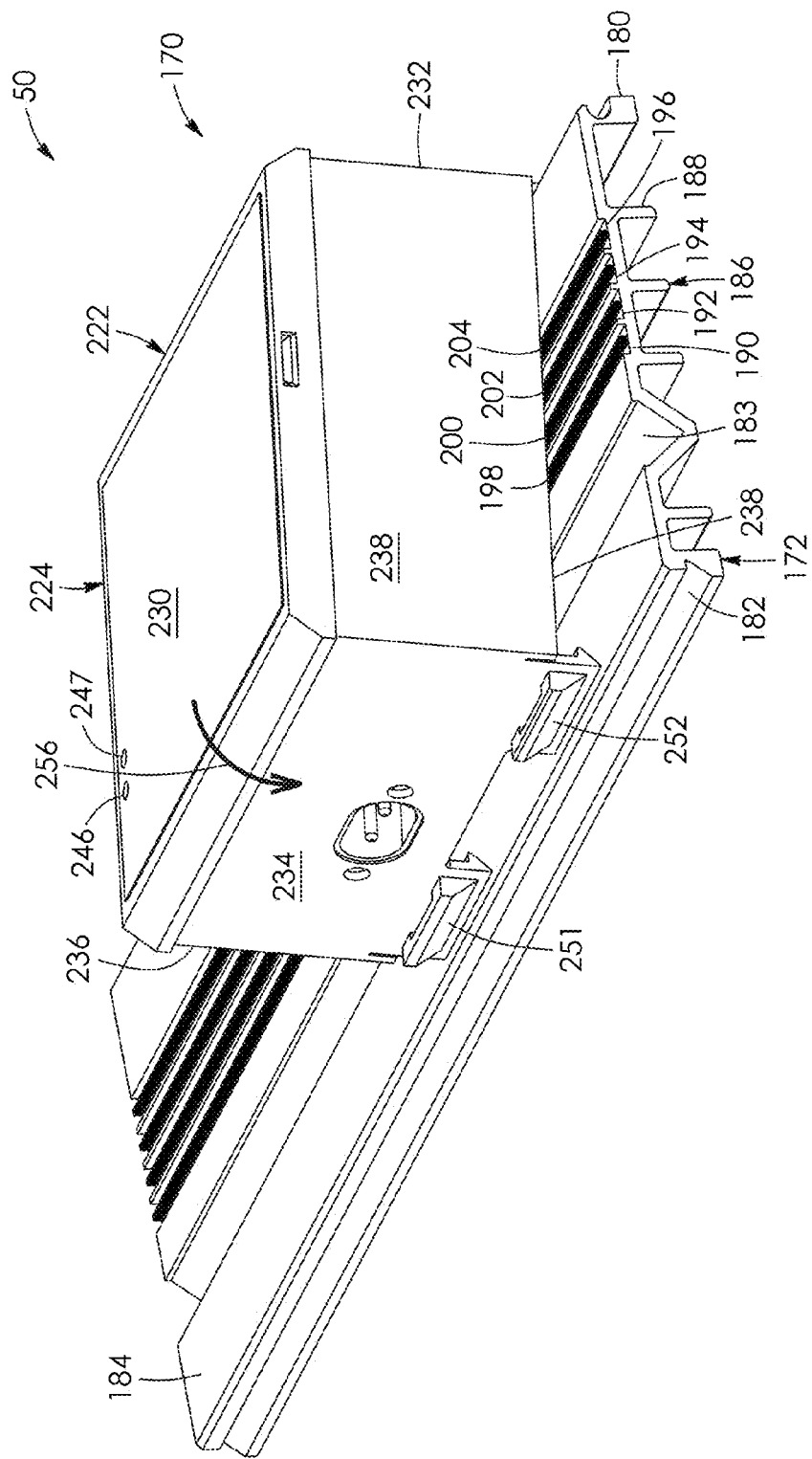
FIG. 5 is a front, side perspective view of the transformer module of FIG. 4 in the process of being connected to the track of FIG. 4.
Figure 6:
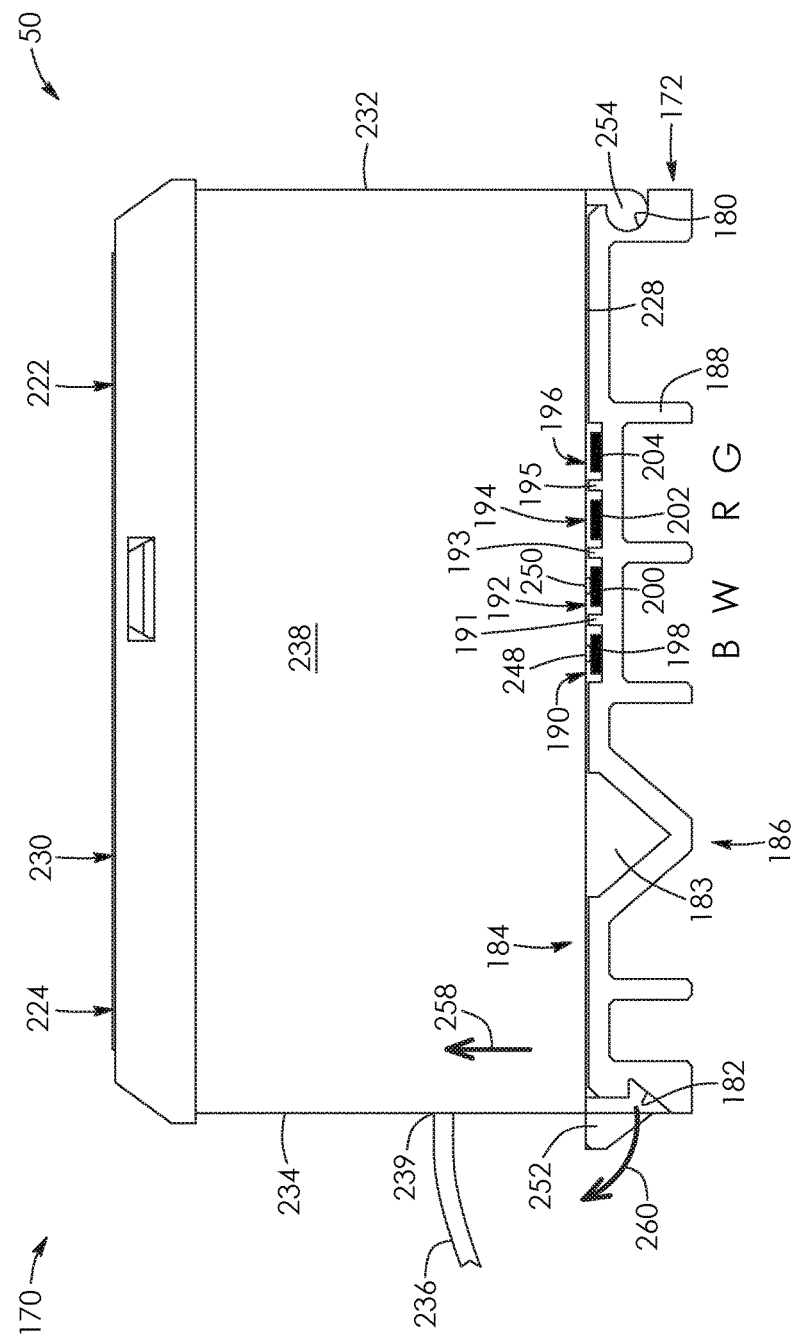
FIG. 6 is an end elevation view of the transformer module of FIG. 4 shown coupled to the track thereof.

As seen in FIG. 3, each of the tracks 172 has a body 173 which is elongate, planar, generally rectangular in shape in this example, and is made of extruded plastic rail in this example. As seen in FIG. 5, each track has a pair of spaced-apart, longitudinally-extending recessed edge portions 180 and 182 of different shapes which are non-symmetrical with each other. As seen in FIG. 6, in this example edge portions 180 of the tracks 172 is in the shape of one of an elongate rounded recessed member which is outwardly concave in this example. Edge portions 182 of the tracks are triangular in cross-section in this example and shaped to receive a hook-shaped member for snap-fit connection.

Each track 172 has a top 184 that is generally planar and a bottom 186 opposite the top. The top and bottom of the tracks 172 extend between the edge portions 180 and 182 thereof. As seen in FIG. 5, the tracks 172 include a plurality of spaced-apart and longitudinally-extending support flanges 188 which extend from the top 184 to the bottom 186 thereof and which are interposed between edge portions 180 and 182 thereof. The support flanges are rectangular prisms in shape in this example and function to space the top 184 of the track 172 from the bottom thereof.

As seen in FIG. 5, each track 172 includes a longitudinally-extending fastener channel 183. Each fastener channel is interposed between edge portion 182 of its track and support flanges 188 in this example, and extends from the top 184 to the bottom 186 of the track. As seen in FIG. 3, the fastener channel is v-shaped in profile in this example and is shaped to receive a plurality of longitudinally spaced-apart fasteners, in this example flat-headed screws 185. The screws extend partially through the fastener channel 183 for threadably coupling to a wall or baseboard (not shown), with heads 187 of the screws abutting and being received by the fastener channel. In this manner, the tracks 172 are selectively connectable to the wall or baseboard.

As best seen in FIGS. 5 and 6, the tracks 172 include a plurality of longitudinally-extending conductor channels 190, 192, 194 and 196 which are adjacent to each other, interposed between the edge portions 180 and 182 thereof and adjacent to support flange 188. The conductor channels are u-shaped in cross-section in this example and extend downwards from the tops 184 of the tracks 172. Referring to FIG. 6, conductor channels 190, 192, 194 and 196 are made of non-conducting material, in this example plastic, with a plurality of elongate strips 191, 193 and 195 made of the same being interposed between the conductor channels 190, 192, 194 and 196, respectively.

Each of the tracks 172 includes a plurality of spaced-apart, longitudinally-extending electrical conductors including: elongate power conductors 198 and 200 coupled to, extending along and being received within conductor channels 190 and 192, respectively; and a pair of spaced-apart, elongate signal conductors 202 and 204 coupled to, extending along and being receiving within conductor channels 194 and 196, respectively. The power conductors are configured to supply electrical energy to conductive components coupled thereto. The signal conductors 202 and 204 are configured to convey signals therealong. Standard four-conductor thermostat wire (18/4) typically comes in the colors black, white, red and green. It is common standard industry practice in Canada to use black and white wire colors for power applications, with power conductors 198 and 200 thus being labelled B and W in FIG. 6. Standard industry practice is to use red and green wire colors for end switch or signal operations, with signal conductors 202 and 204 thus being labeled R and G in FIG. 6.

As seen in FIG. 3, the hydronic system 50 in this example includes a plurality of housings, one for each of the tracks, for selectively enclosing the modular track wiring assemblies 170. This is exemplified by housing 206 which has an interior 207 and a base 208 upon which the tracks may abut or couple. Each housing has a pair of spaced-apart sides 210 and 212 having proximal ends 214 integrally connected to and extending from its base 208 thereof and distal ends 216 spaced-apart from the proximal end. A plurality of longitudinally spaced-apart, removable push-out tabs 218 extend along each of the sides and base. Each housing 206 includes a removable cover 220 shaped to selectively couple to the distal ends 216 of the sides 210 and 212 of thereof. Base 208, sides 210 and 212 and cover 220 form enclosure for at least partially enclosing respective ones of the tracks 172 including components connected thereon.

Figure 7:
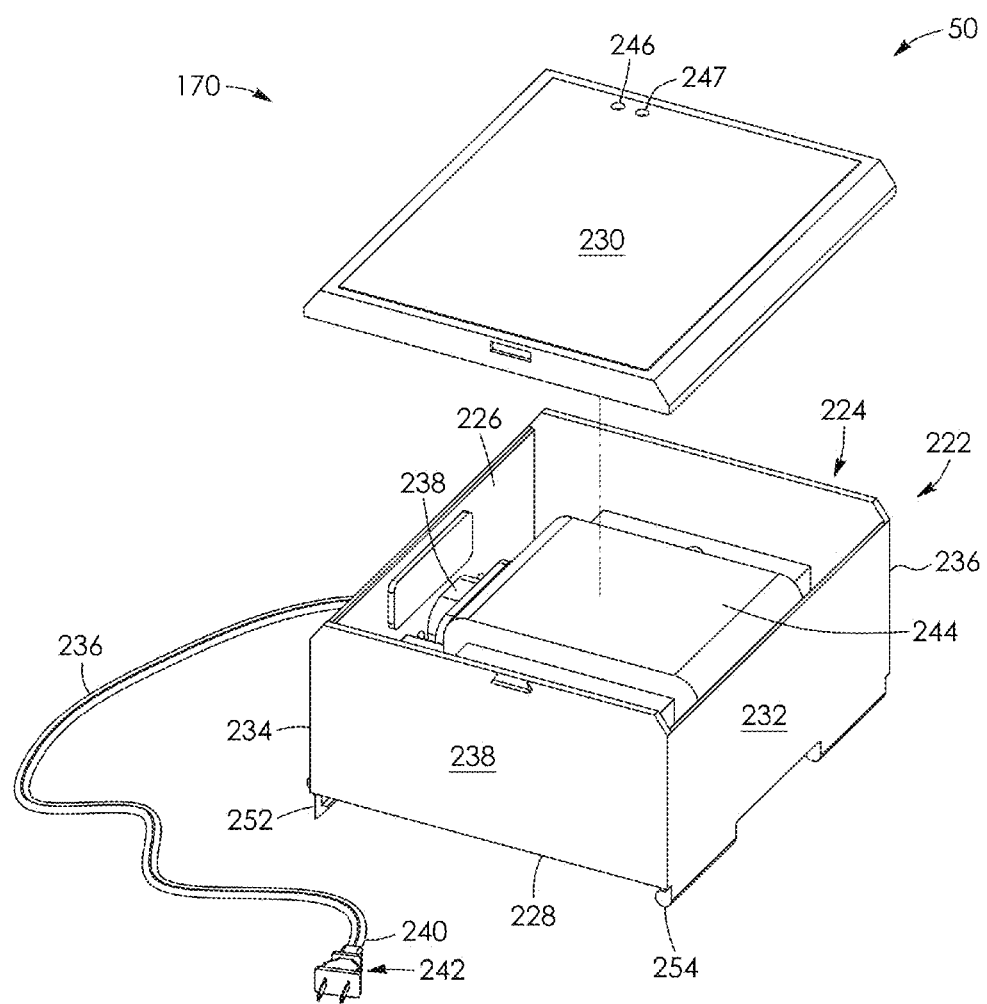
FIG. 7 is an exploded perspective view of the transformer module of FIG. 4, the module including a cover that is spaced-apart from the rest of the module to reveal interior contents thereof and including an outlet plug.

As seen in FIG. 7, the modular track wiring assembly 170 includes a transformer module 222. The module 222 includes a hollow housing 224 which is generally in the shape of a rectangular prism in this example. The housing has an interior 226, a base 228, a removable cover 230 spaced-apart from the base, a top end 232, a bottom end 234 spaced-apart from the top end, and a pair of spaced-apart sides 236 and 238. The ends and sides of the housing 224 extend between the base and cover thereof. The sides 236 and 238 of the housing extend between the ends 232 and 234 thereof.

The transformer module 222 includes an electric cable 236 having a proximal end 239 extending through bottom end 234 of the housing 224 and a distal end 240 spaced-apart from the proximal end. The module includes an outlet plug 242 at the distal end 240 of the cable. The outlet plug is connectable to an electrical outlet (not shown) for receiving a high input voltage.

The transformer module 222 further includes a transformer 244 positioned within the interior 226 of housing 224. The transformer is operatively coupled to the proximal end 239 of cable 236. The transformer module 222 is thus connectable to a high voltage source. As seen in FIG. 6, the transformer module 222 includes a pair of spaced-apart leads, in this example in the form of outwardly-biased, spring-loaded pins 248 and 250 extending downwards from the base 228 of housing 224 from the perspective of FIG. 6. Each of the pins is configured to align with and engage with power conductors 198 and 200.

Transformer 244 is operatively interposed between cable 236 and pins 248 and 250, and is configured to transform high input voltage received from cable 236 to a low output voltage. In this example, the transformer reduces an input voltage of either 120 VAC or 240 VAC via a built-in switch to an output of 24 VAC outputted via pins 248 and 250 seen in FIG. 6. Pins 248 and 250 thus provide power to power conductors 198 and 200 of the track 172. This energy is used in this example to drive zone valve motors and energize relays for switching power and signals to devices such as circulating pumps, as will be described in further detail below.

The input voltage option is available for international installations and can be adapted to various electrical receptacles in various countries with the use of a corresponding plug for the electrical system at hand. The transformer module 222 requires no tools or "hard" wiring by an electrician to be installed; rather, it can simply plug into a nearby power receptacle. Transformers per se, including their parts and functionings, are well-known to those skilled in the art and therefore will be not be described in further detail.

As seen in FIG. 7, the transformer module 222 has diagnostic lights 246 and 247 configured to emit light signals for confirming line voltage (120-240V) and low voltage (24V), respectively. The module includes a protective, replaceable fuse (not shown) in this example.

Figure 4:
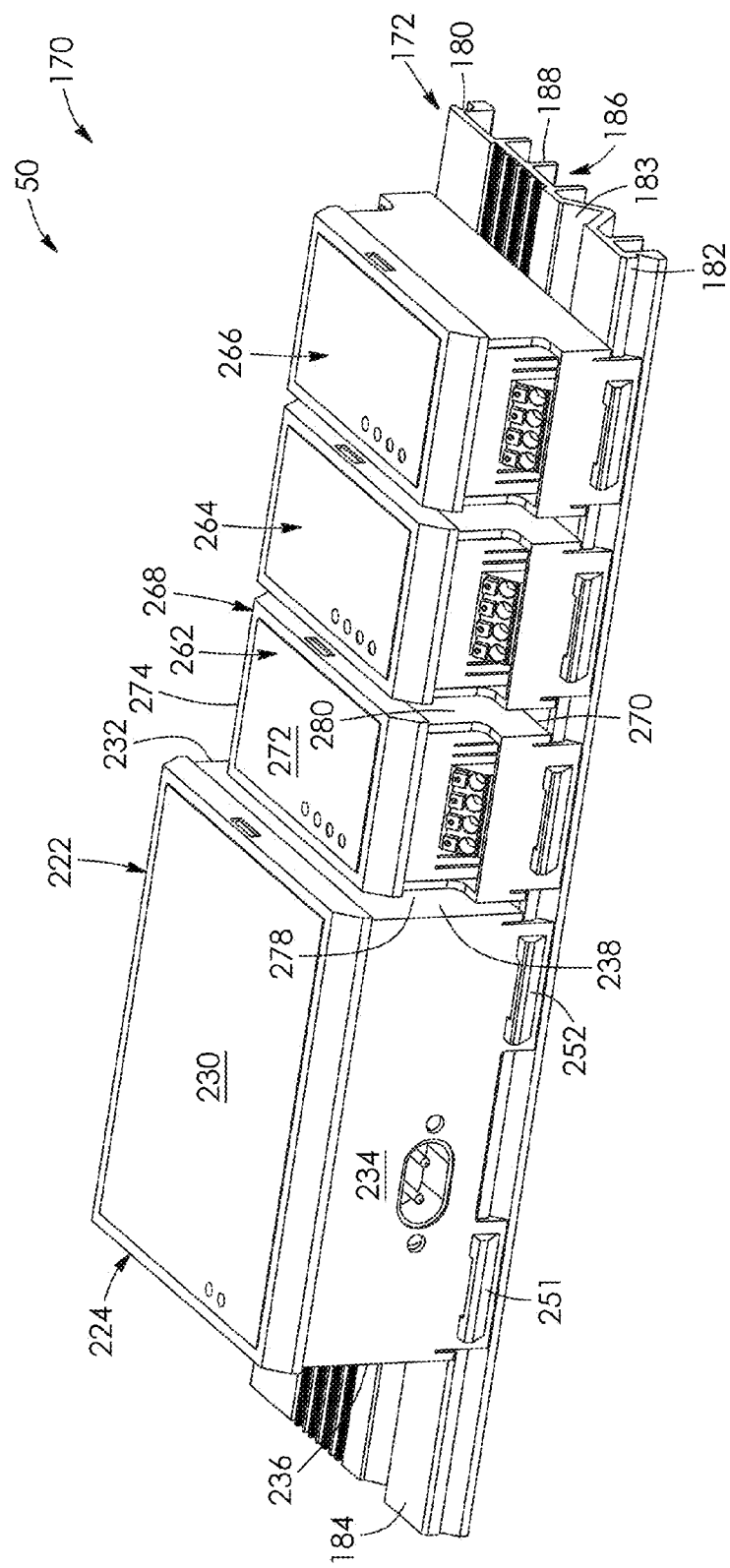
FIG. 4 is a front, top perspective view of the track and modules of FIG. 3, with the housing being not shown, the modules includes a transformer module and a plurality of zone modules.

As seen in FIG. 4, the transformer module 222 includes a pair of spaced-apart longitudinally spaced-apart and longitudinally-extending lower protrusions, in this example longitudinally-extending, resilient male protrusions in the form of catches 251 and 252 which extend outwards from bottom end 234 of housing 224 in a downward direction relative to FIG. 6. As seen in FIG. 6, the catches are hook-shaped in cross-section in this example. Catches 251 and 252 are shaped to be received by and couple with recessed edge portion 182 of track 172 in a snap-fit manner in this example.

Referring to FIG. 6, the transformer module 222 further includes a longitudinally-extending upper male protrusion in this example which aligns opposite the catches, as seen in FIG. 6 by protrusion 254 aligning opposite catch 252. The protrusion 254 extends outwards from top end 232 of housing 224 in a downward direction relative to FIG. 6. The protrusion 254 is rounded and circular in cross-section and is shaped to be received within and rotatable couple with recessed edge portion 180 of track 172 in this example. Protrusion 254 is of a shape that is different from, and non-symmetrical with, catches 252. The non-symmetrical nature of recessed edge portions 180 and 182 of the tracks 172 may promote installation of the module 222 in the correct orientation.

Thus, in operation and referring to FIG. 5, the transformer module 222 is selectively connectable to track 172 by inserting protrusions 254 within recessed edge portion 180 of the track. Thereafter, the rest of the housing 224 may be pivoted downwards relative to FIG. 5, as seen by arrow of numeral 256, with catches 251 and 252 coupling with recessed edge portion 182 of the track as seen in FIG. 6. Prying tabs 252 and pulling the module 222 upwards, as indicated by arrow of numeral 258, causes catches 252 to bend outwards, as indicated by arrow of numeral 260, for selectively removing the module as desired.

As seen in FIG. 6, pins 248 and 250 are configured to align with and electrically connect with power conductors 198 and 200 when the transformer module 222 is so coupled to track 172, with the module supplying the power conductors with electrical energy having low output voltage.

As seen in FIGS. 3 and 4, the modular track wiring assembly 170 includes a plurality of other modules per track including power modules 262 and 264 and zone modules 266. Each of the modules is generally the same in outer configuration and thus only module 262 will be described in detail. Module 262 includes a hollow housing 268 which is generally in the shape of a rectangular prism in this example. The housing has a base 270, a removable cover 272 which is spaced-apart from the base, a top end 274, a bottom end 276 spaced-apart from the top end, and a pair of spaced-apart sides 278 and 280. The ends and sides of the housing 268 extend between the base and cover thereof. The sides 278 and 280 of the housing extend between the ends 274 and 276 thereof.

Figure 8:
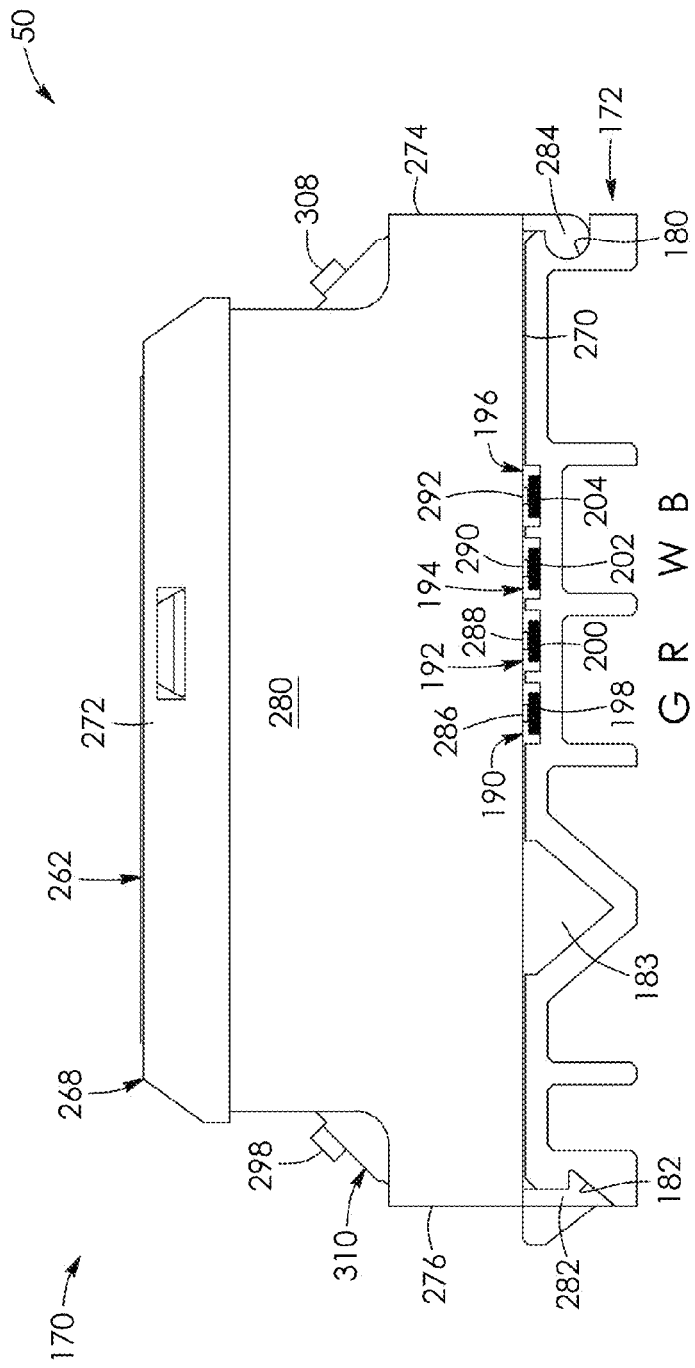
FIG. 8 is an end elevation view of one of the zone modules of FIG. 4 shown coupled to the track of FIG. 4.

As seen in FIG. 8, each of the modules 262 includes a longitudinally-extending lower protrusion, in this example a longitudinally-extending, resilient male protrusion in the form of a catch 282. The catch extends outwards from bottom end 276 of housing 268 in a downward direction relative to FIG. 8. Each catch is hook-shaped in cross-section in this example, is substantially similar in shape to catches 251 and 252 of module 222 seen in FIG. 6, and is shaped to be received by and couple with recessed edge portion 182 of track 172 in a snap-fit manner in this example. Referring to FIG. 8, each of the modules 262 includes a longitudinally-extending upper male protrusion 284 in this example which aligns opposite its catch. The protrusion 284 extends outwards from top end 274 of housing 268 in a downward direction relative to FIG. 8. The protrusion 284 is rounded and circular in cross-section, being substantially similar in shape to protrusion 254 of module 222 seen in FIG. 6. The protrusion is shaped to be received within and rotatable couple with recessed edge portion 180 of track 172. In this manner and referring to FIG. 4, each of the modules of assembly 170 as herein described may selectively couple to respective ones of the tracks 172 thereof.

As seen in FIG. 8, each of the modules 262 includes a pair of spaced-apart power leads, in this example in the form of outwardly-biased, spring loaded power pins 286 and 288 for coupling with the power conductors. Each of the modules 262 includes a pair of spaced-apart signal leads, in this example in the form of outwardly-biased, spring loaded signal pins 290 and 292. Each of the pins extends downwards from the base 270 of housing 268 in this example. Power pins 286 and 288 are configured to align with and engage with power conductors 198 and 200. Signal pins 290 and 292 are configured to align with and engage with signal conductors 202 and 204.

Figure 9:
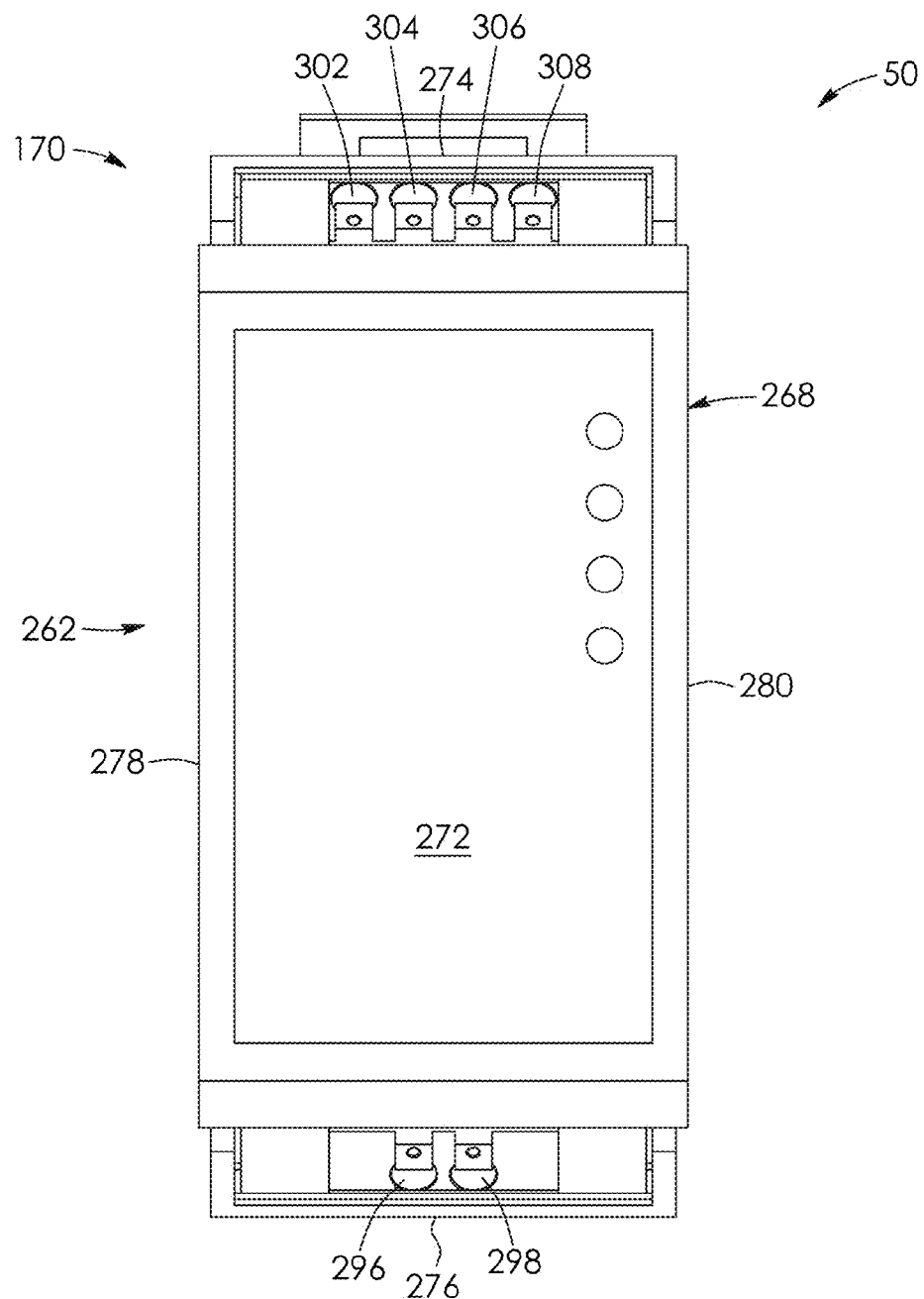
FIG. 9 is a front plan view of the zone module of FIG. 8.

As seen in FIG. 9, each of the modules includes a first plurality of spaced-apart terminals, in this example in the form of two terminals 296 and 298 for power modules 262. Other types of modules in the modular track wiring assembly 170 may have additional terminals. Terminals 296 and 298 are positioned adjacent to bottom end 276 of housing 268. As seen in FIG. 9, each of the modules includes a second plurality of spaced-apart terminals, in this example in the form of four terminals 302, 304, 306 and 308 for power modules 262. Other modules of assembly 170 may have more or fewer terminals. Terminals 302, 304, 306 and 308 are positioned adjacent to top end 274 of the housing 268.

As seen in FIG. 8, each of the modules 262 includes an electrical connector for each of its terminals in this example, as shown by connector 310 for terminal 298. Each connector is configured to selectively receive and couple thereto an exposed end of an electrical cable (not shown). Each connector 310 in this example is in the form of a quick-connect push-in wiring terminal to reduce installer time and eliminate the need for screwdrivers, for example. Electrical connectors 310 per se, including their various parts and functionings, are well-known to those skilled in the art and therefore will not be described in further detail.

Each of the power modules includes a plurality of electrical conductors which couple together various of these pins and connectors, as shown by the schematic diagram of the internal wiring of power module 262 in FIG. 10. In this example, terminal 302 is associated with the letter B (blue), terminal 304 is associated with the letter W (white), terminal 306 is associated with the letter R (red), and terminal 308 is associated with the letter G (green). Each of the power modules 262 includes: a conductor 312 which electrically connects together power pin 286 and terminal 302; a conductor 314 which electrical connects together power pin 288 and terminal 304; a conductor 316 which electrically connects together signal pin 290 and terminal 306; and a conductor 318 which electrically connects together signal pin 292 with terminal 308.

Figure 11:
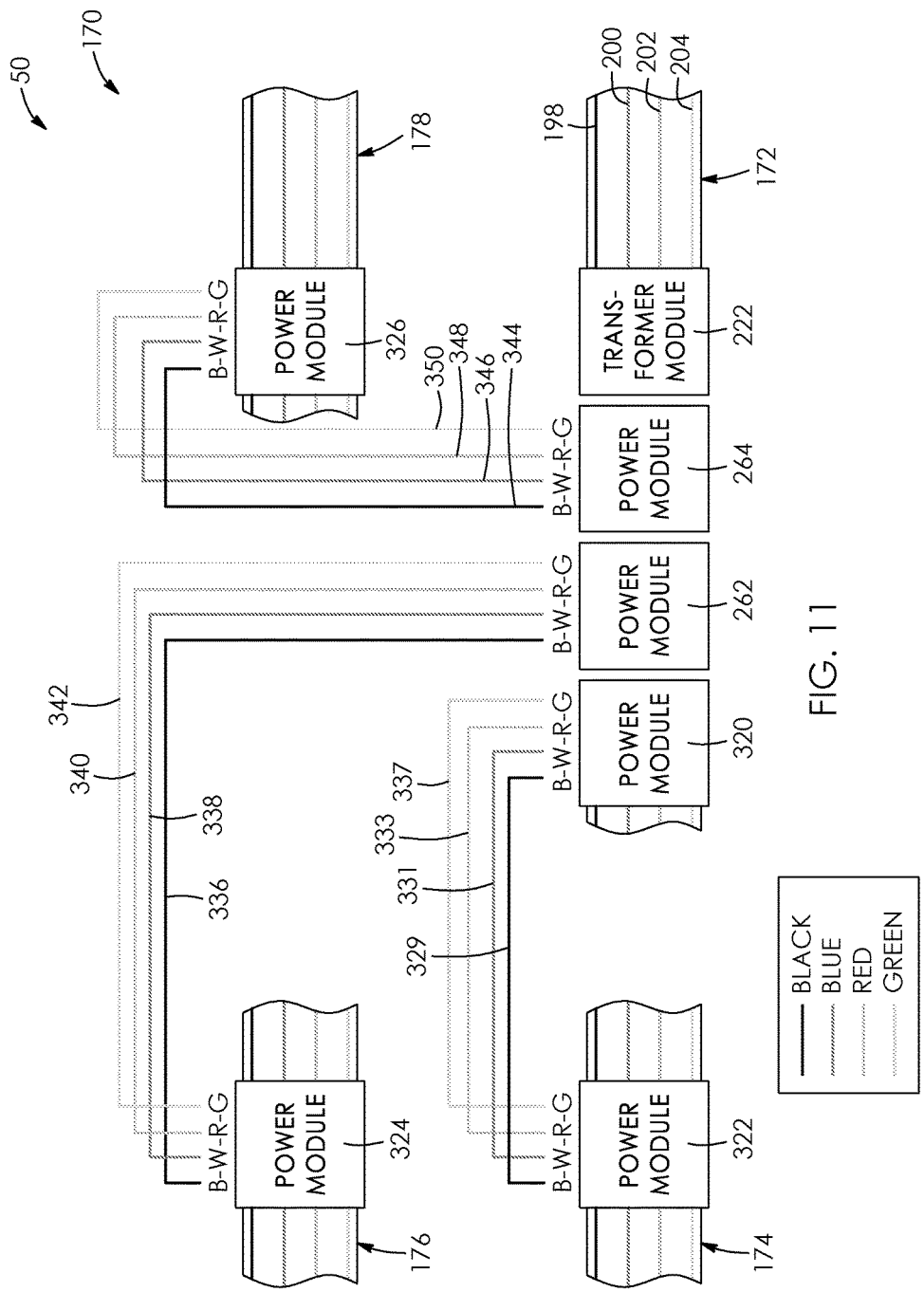
FIG. 11 is a schematic wiring diagram of the power modules of the hydronic system of FIGS. 2A to 2D illustrating an example of how the conductors of the respective ones of the tracks of the hydronic system are coupled together via the power modules, including how electrical energy from the transformer module on a primary track of the hydronic system is distributed via the power modules to remote tracks thereof.

As seen in FIG. 11, modular track wiring assembly 170 includes three power modules 262, 264 and 320 coupled to primary track 172, and an additional three power modules 322, 324 and 326 coupled to remote tracks 174, 176 and 178, respectively. Referring to FIGS. 10 and 11, a plurality of electrical conductors, in this example wires 329, 331, 333 and 337 electrically couples together terminals 302, 304, 306 and 308 of the power modules 320 and 322 of tracks 172 and 174. Similarly, electrical wires 336, 338, 340 and 342 couples the terminals 302, 304, 306 and 308 of respective ones of power modules 262 and 324 of tracks 172 and 176 together. Likewise, electrical wires 344, 346, 348 and 350 couples the terminals 302, 304, 306 and 308 of respective ones of power modules 264 and 326 of tracks 172 and 176 together. The power modules thus extend the range of the transformer module 222 and function to electrically couple together the power conductors 198 and 200 and signal conductors 202 and 204 of the tracks. The wires as herein described may be 18/4 gauge wire in this example, though this is not strictly required and other wires may be used in other embodiments. In this manner and referring to FIG. 11, power modules 262, 264, 320, 322, 324 and 326 convert tracks 172, 174, 176 and 178 into what may effectively be considered one continuous track.

The power modules can thus supply 24 VAC to the remote tracks 174, 176 and 178, and enable the return of closed "end" switch signals back to the primary track 172 where the signal(s) may be used either directly by the boiler 52, seen in FIG. 1, for heating operation, or for energizing relays for other devices and equipment as will be further described below.

As seen in FIG. 10, each of the power modules 262 further includes an electrical conductor 325 which couples signal pin 290 to terminal 296 and an electrical conductor 330 which couples signal pin 292 to terminal 298. Terminals 296 and 298 are included for auxiliary use such as, for example, to connect to the boiler 52, seen in FIG. 1, when all available R-G terminals are being used.

As seen in FIG. 3, each of the power modules 262 is supplied in this example with diagnostic lights 327 configured to show that 24 VAC is being supplied along power conductors 198 and 200 of the track 172 and diagnostic lights 325 configured to indicate when a call for heat/cold signal is present along signal conductors 202 and 204.

As seen in FIGS. 2A to 2D, the modular track wiring assembly 170 includes a plurality of zone modules, including: zone module 266 coupled to track 172; zone modules 335 and 336 coupled to track 176 and associated with zones 104 and 106, respectively, as seen in FIG. 1; and zone modules 338, 340, 342 and 345 coupled to track 178 as seen in FIGS. 2A to 2D and associated with zones 114, 112, 110 and 108, respectively, as seen in FIG. 1.

Figure 12:
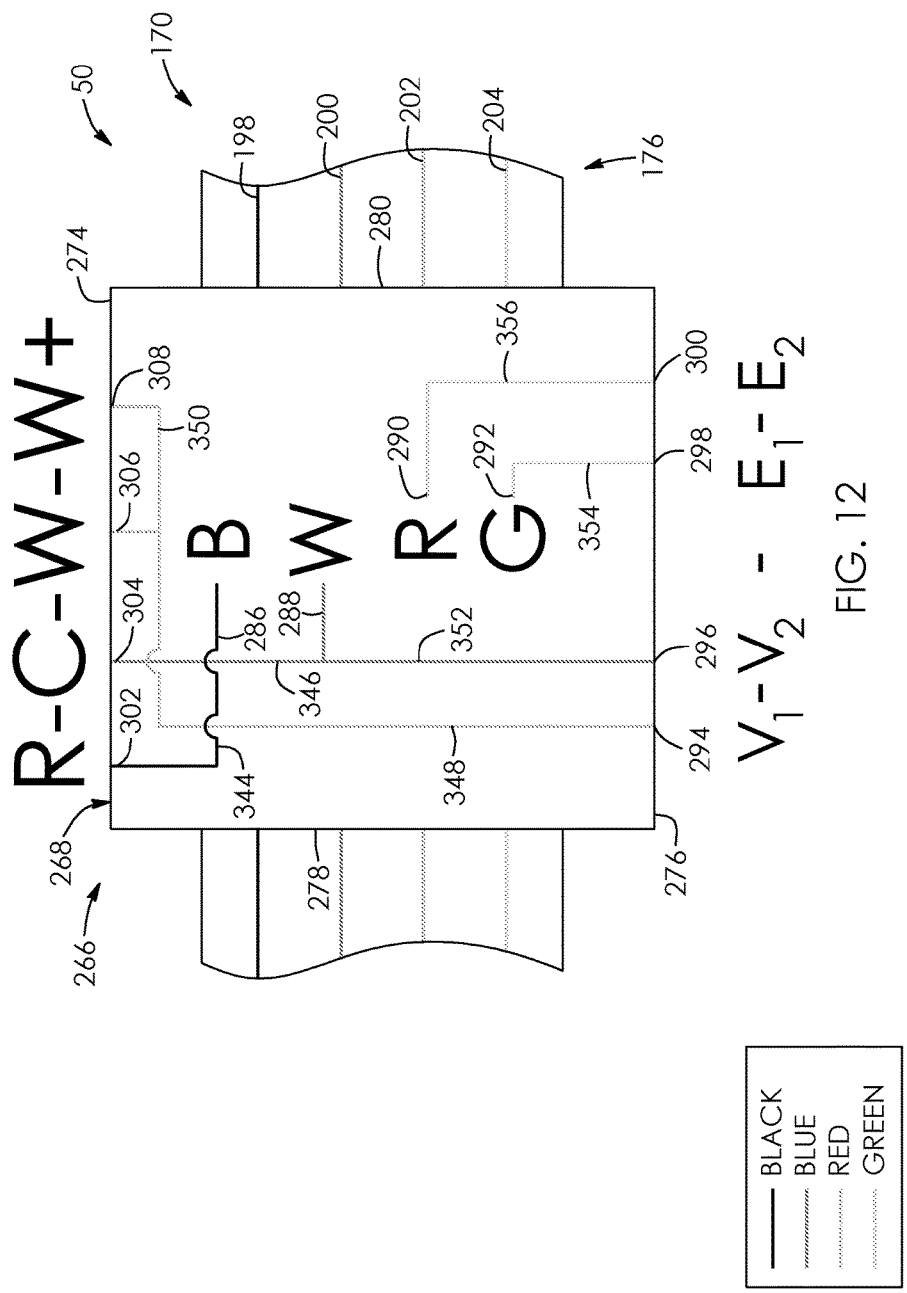
FIG. 12 is an internal schematic wiring diagram of one of the zone modules of the hydronic system of FIGS. 2A to 2D.
Figure 13:
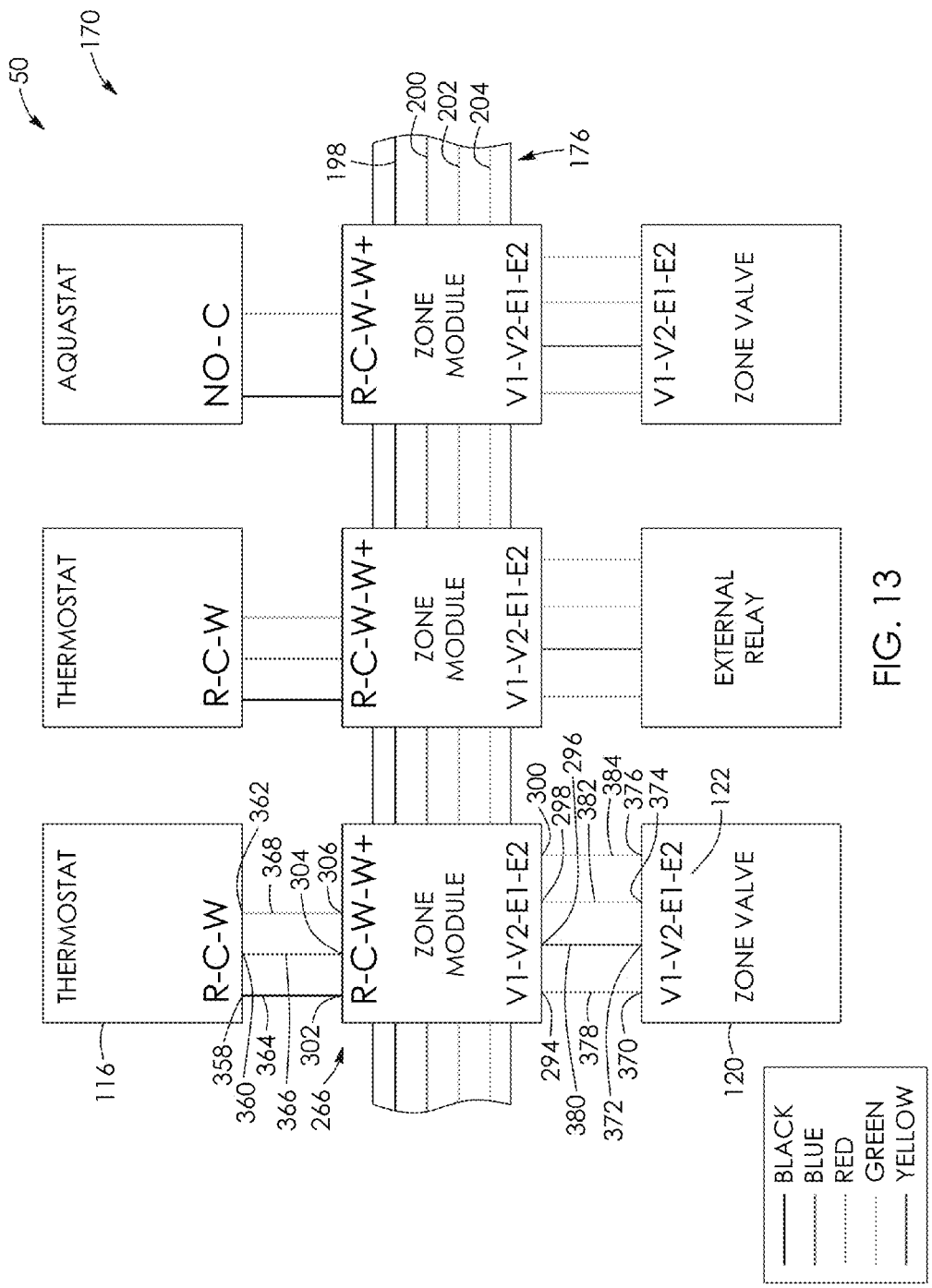
FIG. 13 is a schematic wiring diagram of a plurality of the zone modules of FIGS. 2A to 2D, a first shown coupling a thermostat to a zone valve in a first zone, a second shown coupling a thermostat to an external relay in a second zone, and a third shown coupling an aquastat to a zone valve in a third zone.

As seen in FIG. 13, each of the zone modules 266 includes electrical conductors and is configured via its terminals to electrically couple together the temperature-sensing device, in this example thermostat 116, and zone valve 120 associated with its zone, power the thermostat and zone valve via the power conductors, receive end switch signals when their zone valve 120 is fully open, and convey said signals along the signal conductors to call for heat/cold. Each of the zone modules is substantially the same and thus only zone module 266 seen in FIG. 12 will be described in detail.

The first plurality of spaced-apart terminals of zone module 266 extending from bottom end 276 thereof includes an additional two spaced-apart terminals 294 and 300. Each of the zone modules comprises a plurality of internal electrical conductors including: a conductor 344 which electrically couples together its terminal 302 and power pin 286; a conductor 346 which electrically couples together its terminal 304 and power pin 288; a conductor 348 which electrically couples together its terminals 306 and 294; a conductor 350 which electrically couples together terminals 308 and 294; a conductor 352 which electrically couples together power pin 288 and terminal 296; a conductor 354 which electrically couples together signal pin 292 and terminal 298; and a conductor 356 which electrically couples together signal pin 290 and terminal 300. Terminals 302 and 306 may be referred to as thermostat input and output terminals in this example.

As seen in FIG. 13, each of the thermostats 116 of the modular wiring assembly 170 has a plurality of terminals including a power input terminal 358 labelled R, a terminal 360 for electronic or digital thermostats labelled C, and a power output terminal 362 labelled W. A plurality of electrical conductors, in this example wires couples each zone module 266 with the corresponding thermostat for its zone, including: wire 364 which electrically couples terminal 302 of module 266 to power input terminal 358 of the thermostat; wire 366 which electrically couples terminal 304 of the module to terminal 360 of the thermostat in cases where the thermostat is electronic or digital; and wire 368 which electrically couples terminal 306 of the module to power output terminal 362 of the thermostat. Zone modules 266 can be controlled by thermostats 116 having a C terminal 304/360 connection to allow electronic thermostats to be powered by the system 50 instead of having to depend on batteries. Thermostats per se, including their various parts and functionings, are well-known to those skilled in the art and therefore will not be described in further detail.

Each of the zone valves 120 has a plurality of terminals including a zone valve motor input terminal 370 labelled V1, a zone valve motor output terminal 372 labelled V2, and a pair of end switch terminals 374 and 376 labelled E1 and E2, respectively. A plurality of electrical wires couples each zone module 266 with its corresponding zone valve 120 for its zone, including: wire 378 which electrically couples terminal 294 of module 266 to zone valve motor input terminal 370 of the zone valve; wire 380 which electrically couples terminal 296 of the module to zone valve motor output terminal 372 of the zone valve; wire 382 which electrically couples terminal 298 of the module to end switch terminal 374 of the zone valve; and wire 384 which electrically couples terminal 300 of the module to end switch terminal 376 of the zone valve. Zone valves per se, including their various parts and functionings, such as zone valve motors for selectively opening the valves and end switches for determining when the vale is fully open and sending signals thereafter, are well-known to those skilled in the art and therefore will not be described in additional detail.

In operation, power is directed to the thermostat on terminal 302. For electronic or digital thermostats, the thermostat is energized by connecting the terminals 304 and 360 on the module 266 and thermostat 116. On a call for heat, that is when the thermostat determines that the zone temperature deviates from a threshold temperature range, the thermostat closes and the thermostat outputs a valve-actuation signal, in this case a 24 volt signal from terminal 306 to terminal 370 (V1) of the zone module 120 through the internal wiring of the module 266. This energizes the zone valve motor 143 of the zone control valve 120 seen in FIG. 1 and the valve opens as a result to allow the flow of hot/cold water to circulate through the zone fluid loop of its zone 104, as for example shown by loop 118.

Once the zone valve is fully open, a small micro end switch 122 in the valve closes and outputs a call for heat/cold signal through terminals 374/298 shown in FIGS. 13 and 376/300 (E1-E2) to signal pins 290 and 292 (R-G) shown in FIG. 12. This signal will then either be connected to a boiler activation circuit (TT or TH) or to a relay which will start other equipment (circulating pumps, boiler, fans). Each of the zone modules 266 has diagnostic lights which show: 24 VAC present; a thermostat call for heat; and when the end switch is closed. The signal conductors are thus in communication with a given heat/cold source and the heat/cold source is configured to supply heat/cold to the loop 118 of the zone 104 upon receiving the call to heat/cold signal.

Referring to FIGS. 2A to 2D, this is repeated for every thermostat/aquastat and zone valve in the system 50. Where multiple zone control valves connect to the same thermostat, a simple "daisy-chain" connection between adjacent zone modules is made which then powers the additional valve(s) in a parallel circuit, as seen by terminal 308 of zone module 338 coupling via wire 386 to terminal 306 of zone module 340 and zone valve 156 being powered thereby upon receiving a signal that thermostat 141 has closed.

Figure 14:
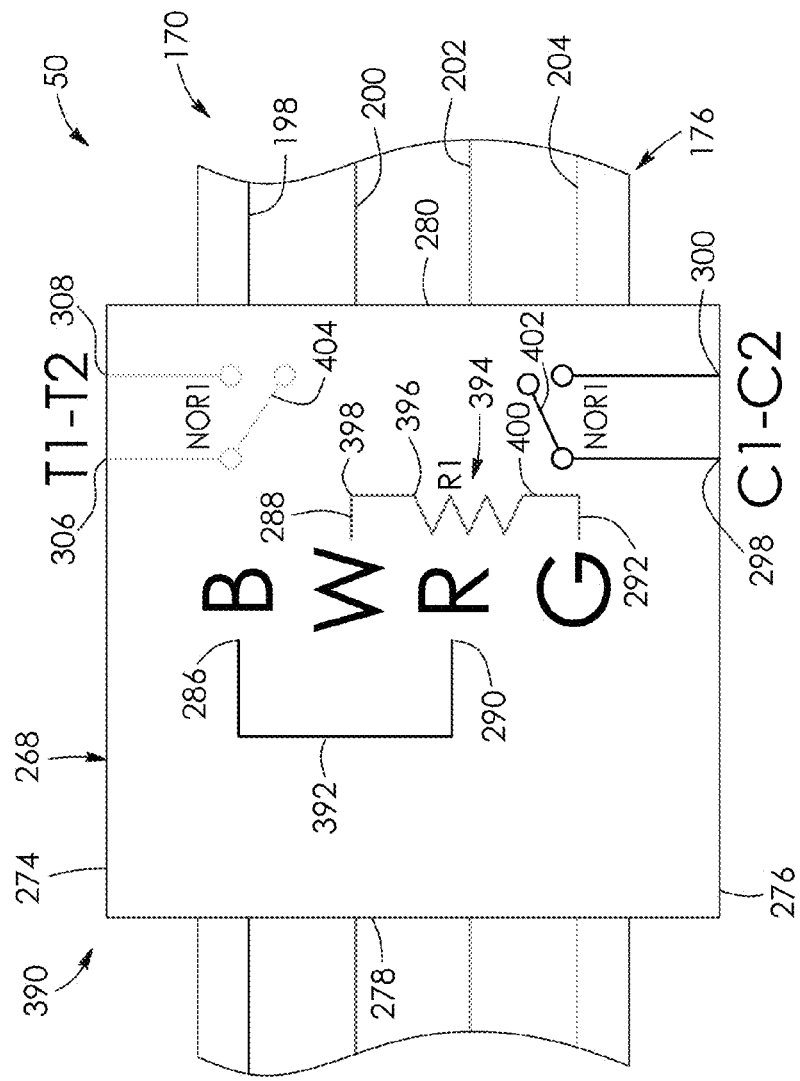
FIG. 14 is an internal schematic wiring diagram of one of the relay modules of the hydronic system of FIGS. 2A to 2D.

Referring now to FIG. 14, the modular wiring assembly 170 may include a relay module 390. The module is configured to couple power conductor 198 to signal conductor 202 via an electrical conductor 392 which couples power pin 286 and signal pin 290 of the module together. The module 390 further includes a relay 394 which incorporates an electromagnet 396 coupled to and interposed between power conductor 200 and signal conductor 204 via power pin 288, electrical conductor 398 extending between and connecting the pin and electromagnet together, and electrical conductor 400 extending between and connecting signal pin 292 and the electromagnet together.

Figure 15:
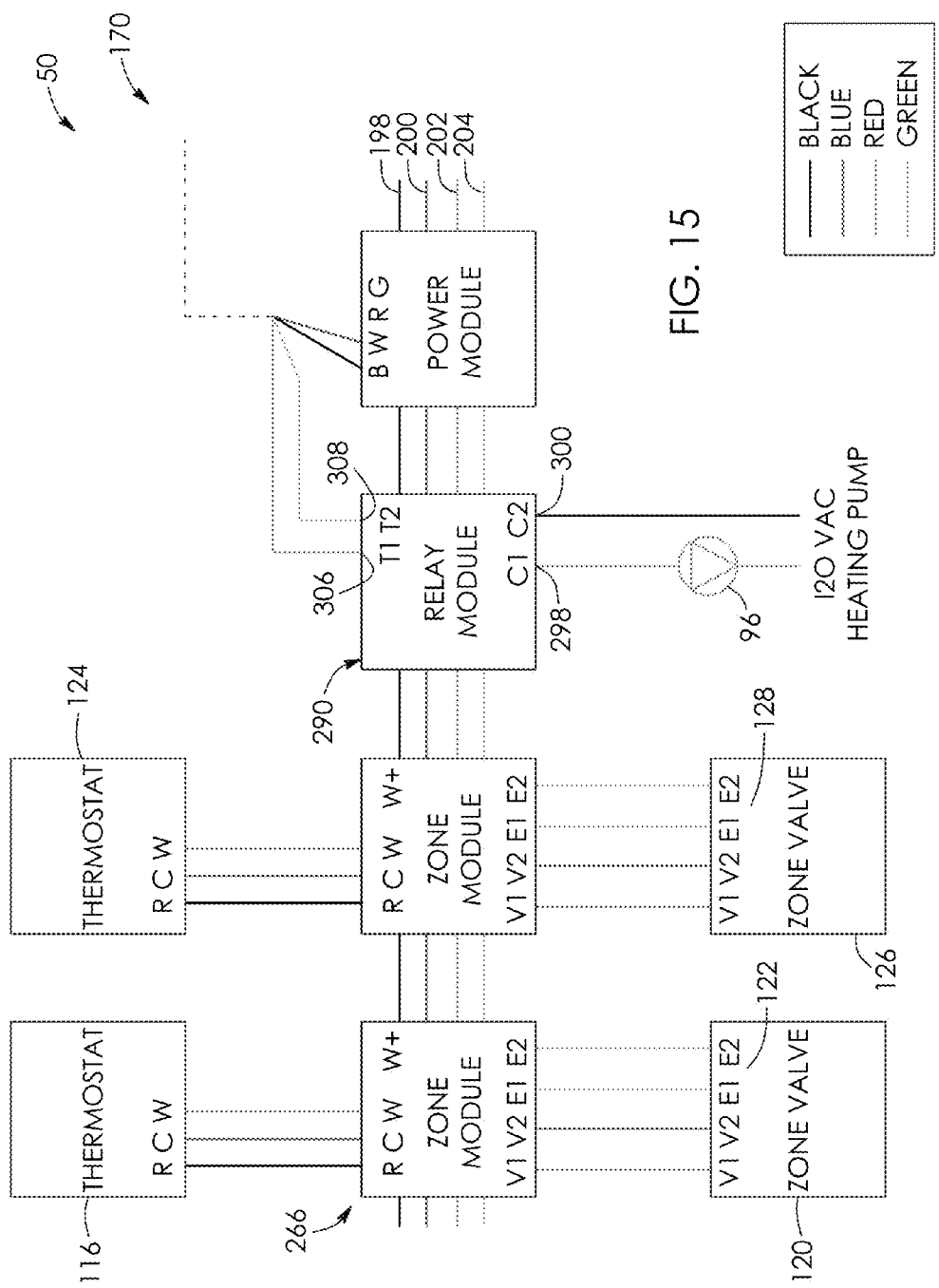
FIG. 15 is part of the schematic wiring diagram of the hydronic system of FIGS. 2A to 2D showing an example of the manner in which the relay module of FIG. 14 couples to the rest of the system.

The relay module 390 includes a first plurality of terminals in the form of terminals 298 and 300 and a second plurality of terminals in the form of terminals 306 and 308. Terminals 298 and 300 and terminals 306 and 308 are configured to be normally open terminals for connecting to auxiliary components, such as a heat/cold source of the system in the form of boiler 52 seen in FIG. 1 and associated circulating pump 96. As seen in FIG. 14, normally open switches 402 and 404 are interposed between and coupling to the terminals 298 and 300 and 306 and 308, respectively. Referring to FIGS. 14 and 15, each of the switches is responsive to the electromagnet 396 whereby the call for heat/cold signal from the end switch of zone valve 120 conveyed along signal conductor 204 causes the electromagnet 396 to close the switches 402 and 404 and activate the boiler 52 and pump 96 seen in FIG. 1.

Thus, the relay module uses a closed switch signal to energize relay 394. The relay may be suitable for single temperature systems as the relay is activated by any closed switch in the system. Power is diverted from the B pin 286 to the R pin 290. This in turn energizes the bottom two sets of track conductors 202 and 204. When an end switch or thermal control closes, power returns to the relay module 390 where it activates the relay 394. This closes the two sets of normally open terminals (T1-T2) and (C1-C2). The relay module 390 includes in this example diagnostic lights to indicate the presence of 24V power and a call for heat/cold signal.

Figure 16:
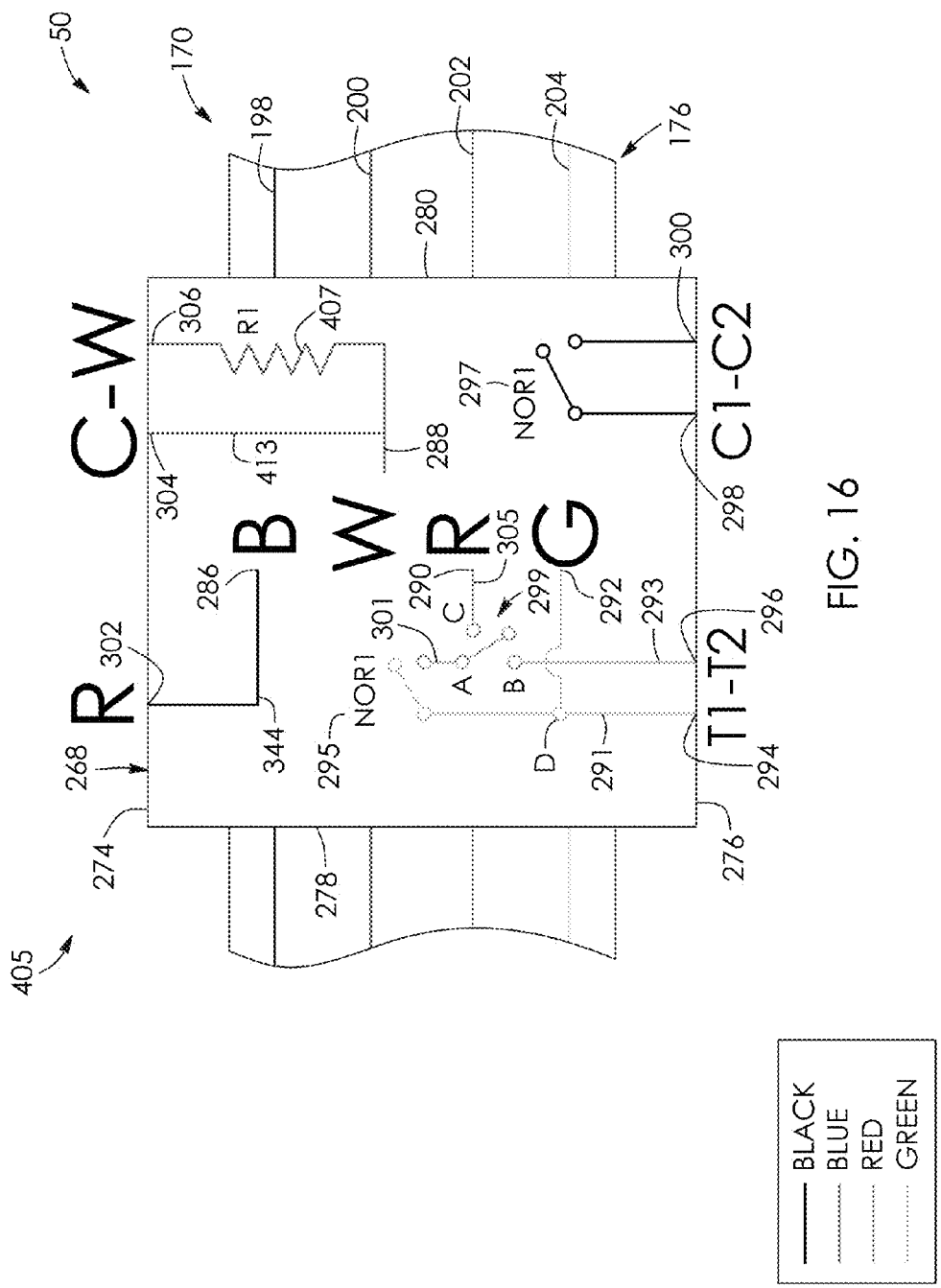
FIG. 16 is an internal schematic wiring diagram of a pump module for the hydronic system of FIGS. 2A to 2D.

As seen in FIG. 16, the modular wiring assembly 170 may include a pump module 405. The module is similar to zone module 266 seen in FIG. 12, with like parts having like numbers, with the following exceptions. The pump module 405 includes a relay 407 coupling to and interposed between terminal 306 (W) and power pin 288 (W). The module includes a wire 413 connecting terminal 304 (C) of the module to power pin 288 (W). Power is diverted from the pin 286 (B) to terminal 302 (R). When a thermal control closes such as that of thermostat 411 in FIG. 17, for example, power returns to the terminal 306 (W) of the module 405 seen in FIG. 16 where it activates the relay 407.

The module includes wires 291 and 293 connected to and extending from terminals 294 (T1) and 296 (T2), respectively. Module 405 further includes a normally open switch 295 (NOR1) interposed between wire 291 and a further wire 301. A wire 305 connects to and extends from pin 290 (R) of the module. The module 405 includes a small two-way actuator, in this example button switch 299 on the exterior of the module adjacent to terminals 294 and 296 (T1-T2). The switch 299 is connected to wire 301.

When depressed, the two-way switch 299 is moveable to a first position in which wires 301 and 305 connect together (A to C). Activation of relay 407 (R1) causes normally-open switch 295 (NOR1) to close, and the signal is routed from pin 290 (R) to the 'C' two way switch contact which then is connected to the 'A' two way switch contact. The signal continues through the normally open switch 295 (NOR1) relay contacts which are now closed, down to the 'D' wiring junction, on to pin 292 (G). In this case a call for heat would send a signal to the track, effectively R to G.

As mentioned above, power is diverted from the B pin 286 to the terminal 302 (R) and when a thermal control closes, power returns to terminal 306 (W) of the module 405 where it activates relay 407. This closes two sets of normally open contacts 295 and 297 (NOR1). One set is C1-C2 which allows for a circulating pump or other device to be connected. The second set of contacts has an optional output to either the track via pins 290 (R) and 292 (G) or to the bottom of the module 405 at terminals T1-T2.

Figure 17:
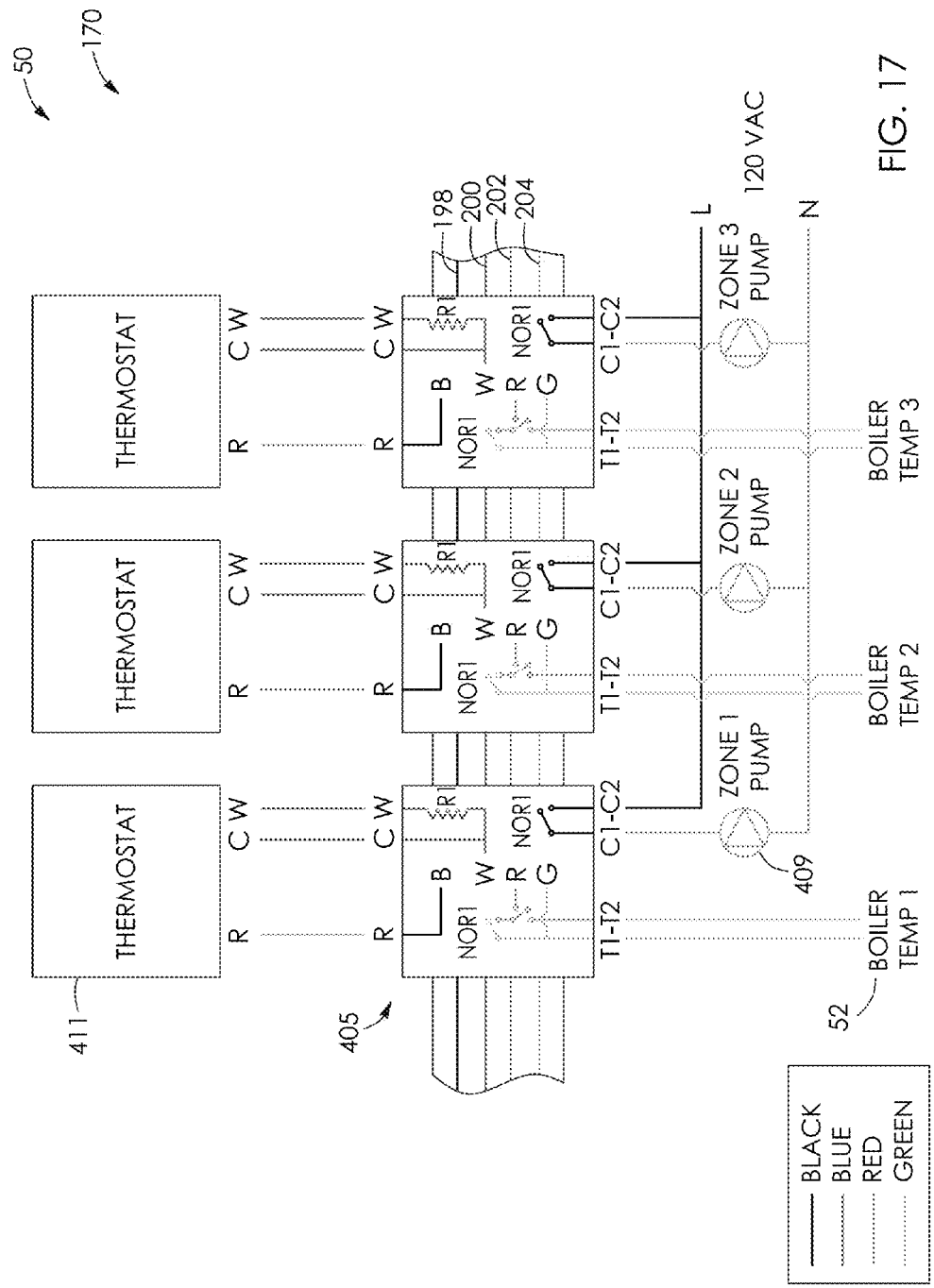
FIG. 17 is a schematic wiring diagram showing examples of how the pump modules of FIG. 16 may couple to the rest of the system of FIG. 1.
Figure 18:
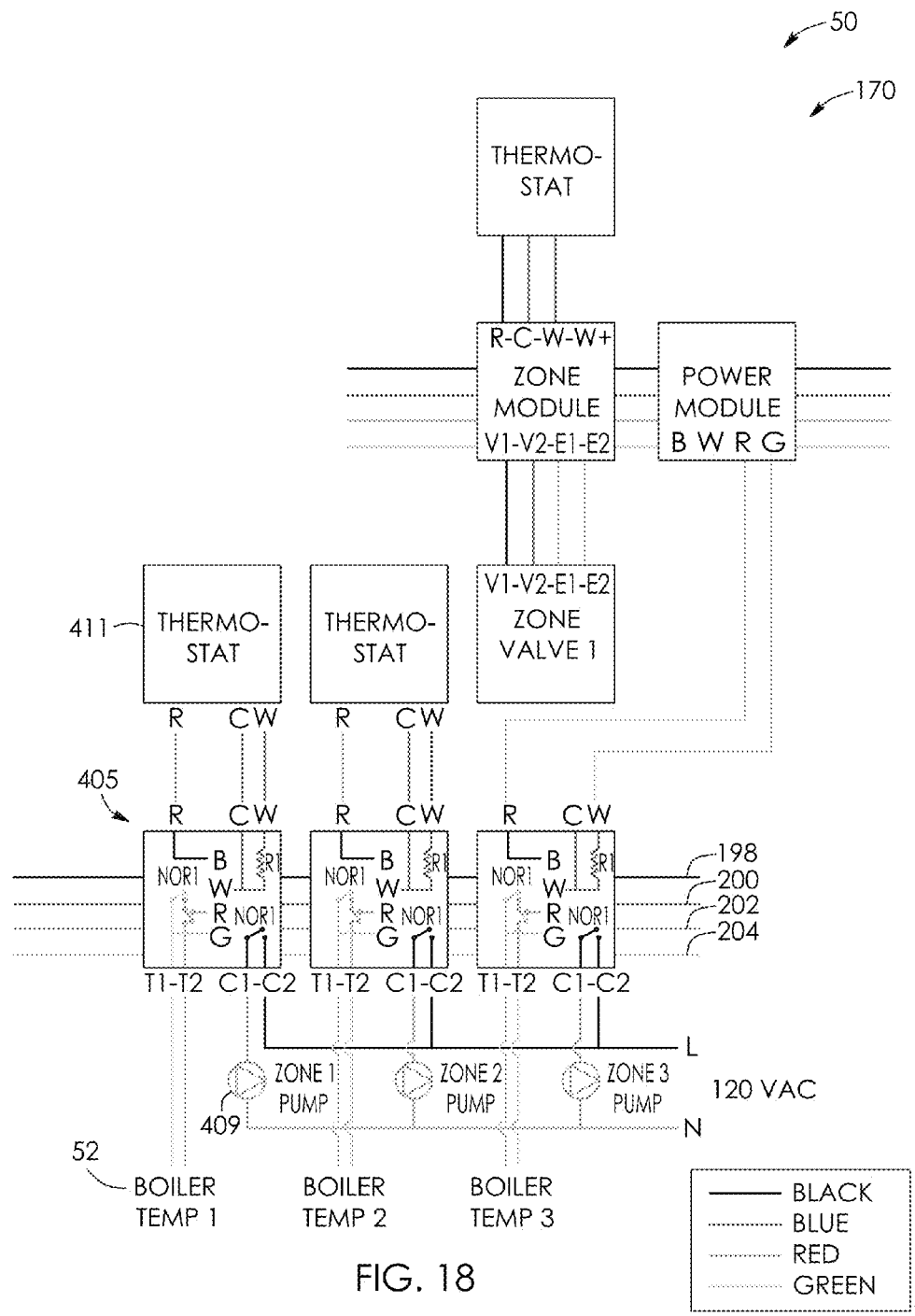
FIG. 18 is a schematic wiring diagram showing other examples of how the pump modules of FIG. 16 may couple to the rest of the system of FIG. 1.

Thus, when thermal or mechanical control, in this example thermostat 411 seen in FIG. 17 closes, a pump actuation signal received therefrom energizes the relay 407. This will in turn close normally open switches 295 and 297 extending between two sets of normally open terminals 294 and 296 (T1-T2) and 298 and 300 (C1-C2), respectively, for uses such as connecting a boiler 52 or other equipment such as a circulating pump 409 seen in FIG. 17. Actuation of the relay 407 (R1) causes the terminals to close for actuating the circulating pump and boiler. This allows the choice of using circulators for zoning but being able to include the call for heat onto the track for common use as in the example of a single temperature system, or to provide separate signals for multiple temperatures. Multiple temperatures can be achieved with a multiple temperature capable boiler or auxiliary mixing methods. Diagnostic lights indicate 24V power and a call for heat.

Pump module 405 is thus suitable for multiple temperature systems as the relay is only activated by one specific switch (thermal or mechanical) from one location in the system. It is best used in applications where circulating pumps are utilized for zoning instead of zone control valves. In another example, the module 405 may use a signal from a specific module or individual remote track to energize the relay 407.

There is a switchable option to send the closed circuit signal either to the track for use is a single temperature system or to terminals at the bottom edge where the signal can be used for other applications such as a multiple temperature system. Referring to FIG. 16, if the two way button switch 299 is not depressed, the two way switch is moveable to a second position which connects wires 293 and 301 together ('A' to 'B'). On a call for heat from the thermostat 411 seen in FIG. 17, and with the normally-open switch 295 (NOR1) seen in FIG. 16 closed, a closed switch is provided at terminals 294 and 296 (T1-T2). This option allows for a signal in a single temperature system to be applied to the signal track through R-G, or alternatively to allow one of a number of signals for a multiple temperature system via the T1-T2 terminals.

Figure 19:
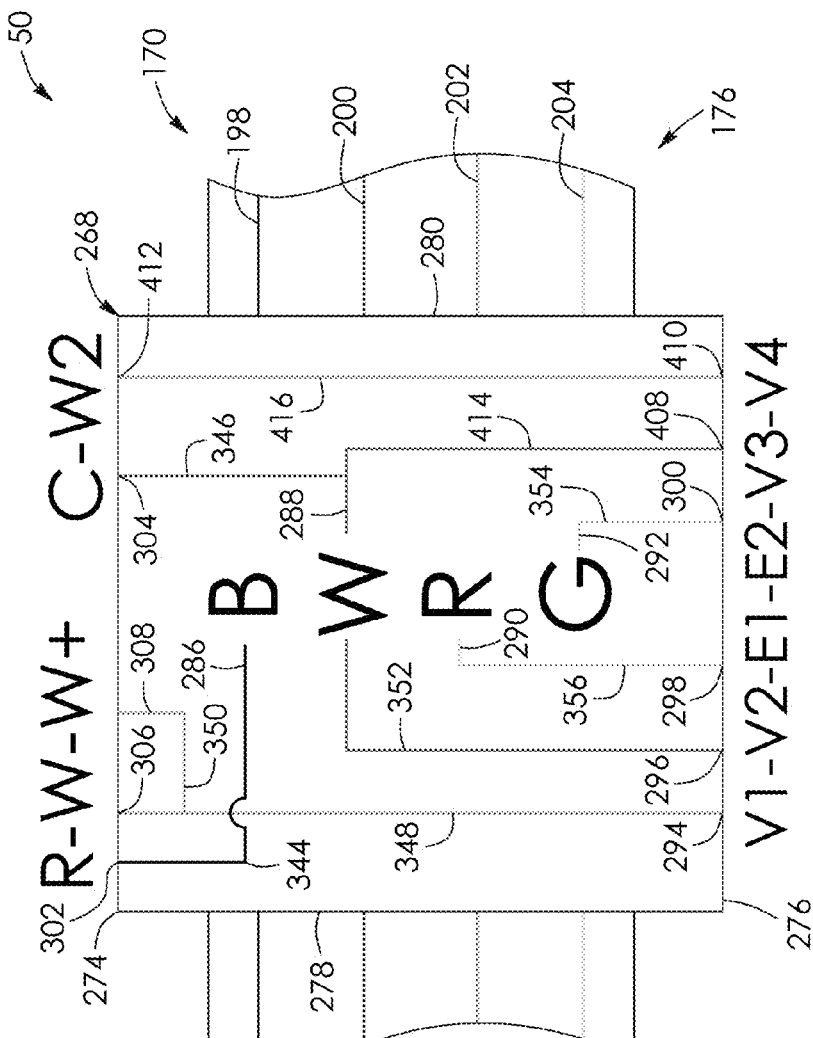
FIG. 19 is an internal schematic wiring diagram of a two-stage zone module of the hydronic system of FIGS. 2A to 2D.
Figure 20:
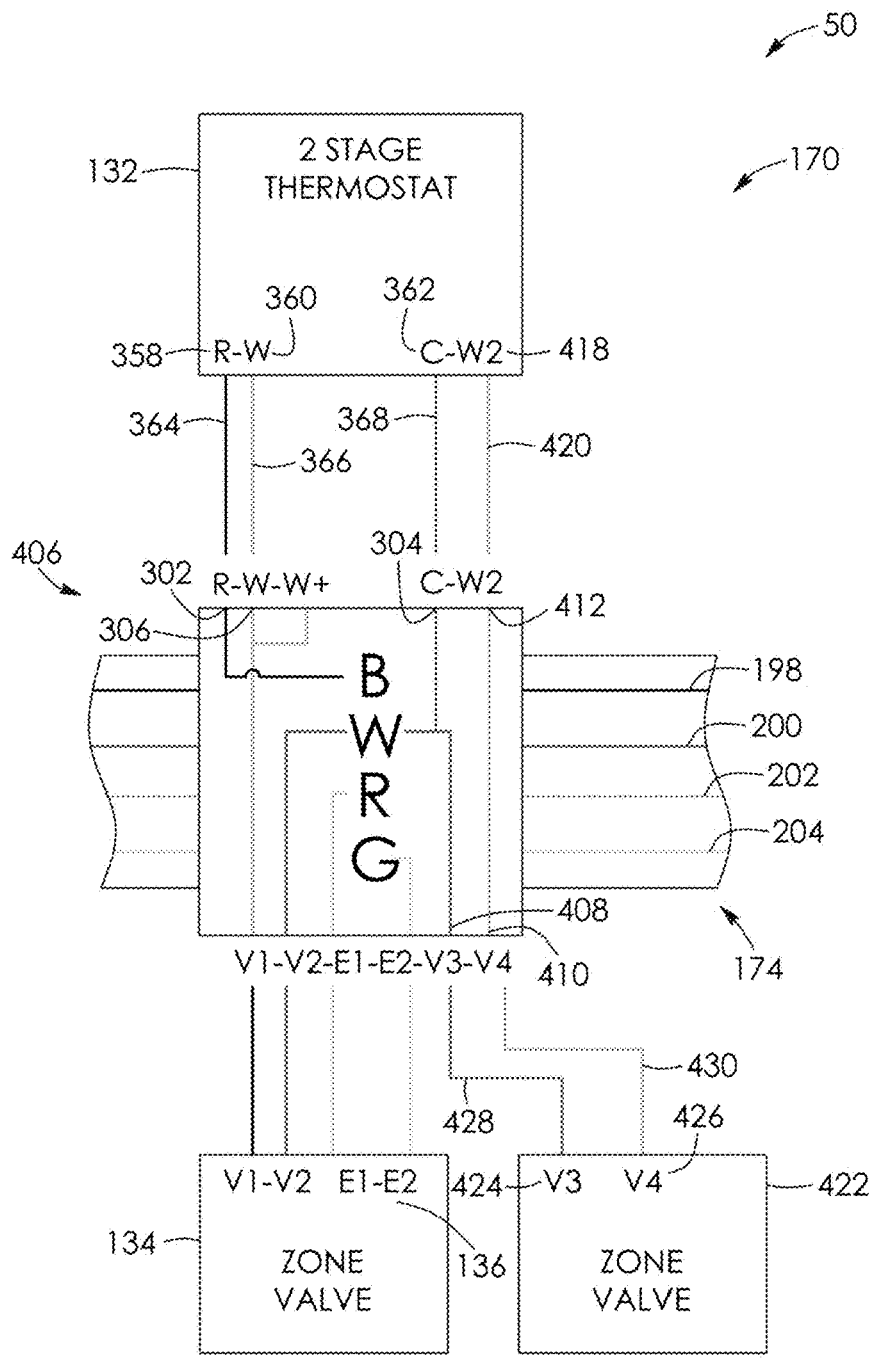
FIG. 20 is a schematic wiring diagram showing an example of how the two-stage zone module of FIG. 19 may couple to the rest of the system of FIG. 1.

Referring now to FIG. 19, the modular wiring assembly 170 may include a two-stage zone module 406 for use with a two-stage thermostat 132. There is an allowance for a second stage of heat for applications where the first stage is insufficient. Two-stage zone module 406 is similar to zone modules 266 seen in FIG. 12, with like parts having like numbers, and with the following exceptions. The first of the plurality of terminals of module 406 includes an additional pair of terminals 408 and 410 (V3-V4) and the second of the plurality of terminals of the module includes an additional terminal 412 (W2). The module includes a series of additional electrical conductors including: a conductor 414 which electrically couples power pin 288 to terminal 408; and a conductor 416 which electrically couples together terminals 410 and 412. Referring to FIG. 20, the two-stage thermostat 132 includes an additional terminal 418 (W2) which couples to terminal 412 of module 406 via a wire 420. The two-stage thermostat outputs an additional valve-actuation signal via terminals 418/412 should the zone temperature continue to deviate from the threshold temperature past a set amount of time. The additional valve-actuation signal may be referred to as a call for additional heating/cooling signal. Two-stage thermostats per se, including their various parts and functionings, are well-known to those skilled in the art and therefore will not be described in further detail.

As seen in FIG. 20, an additional zone valve 422 may couple via its zone valve motor input and output terminals 424 and 426 to terminals 408 and 410 (V3-V4) of the zone module 406 via electrical conductors 428 and 430. In this manner, zone valve 422 may receive power from the thermostat 132 for selectively opening and thereby providing an additional source of circulating heated fluid, for example, for heating the zone.

Figure 21:
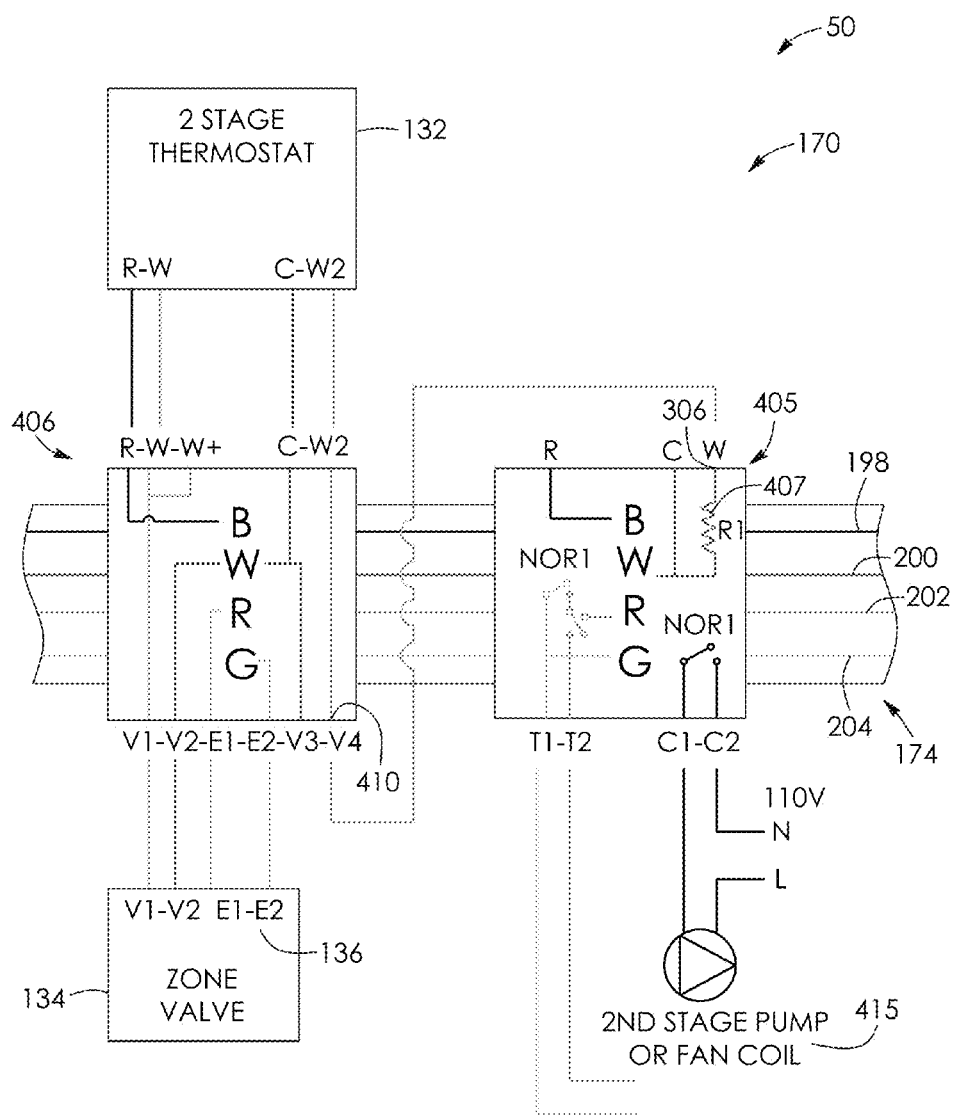
FIG. 21 is a schematic wiring diagram showing another example of how the two-stage zone module of FIG. 19 may couple to the rest of the system of FIGS. 2A to 2D.

Alternatively and as seen in FIG. 21, terminal 410 of two-stage zone module 406 may couple to terminal 306 and relay 407 of pump module 405 for other use such as a fan coil unit or circulator 415. The two-stage zone module includes diagnostic lights to indicate the presence of 24V power, when the thermostat 132 is closed, when the end switch 136 of the primary zone valve 134 is closed (call for heat) and when activation of second stage heating has occurred, for example.

Figure 22:
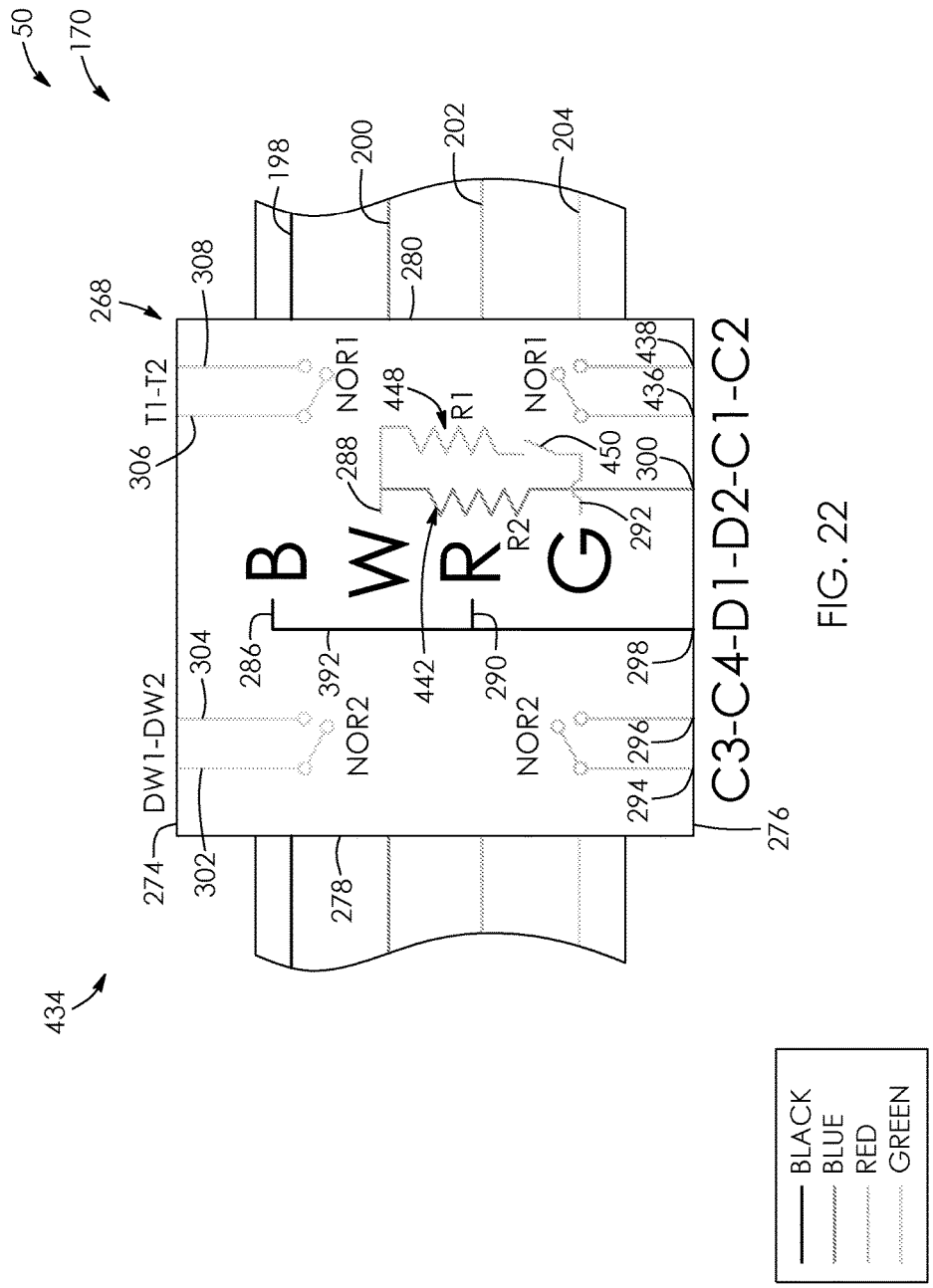
FIG. 22 is an internal schematic wiring diagram of a priority relay module of the hydronic system of FIGS. 2A to 2D.

As seen in FIG. 22, the modular wiring assembly 170 may include a priority relay module 434, which is similar to relay module 390 seen in FIG. 14 with some exceptions. Module 434 includes a first pair of normally open terminals 306 and 308 (T1-T2) connectable to a primary heat/cold source of the system such as boiler 52 seen in FIG. 23. Referring back to FIG. 22, the module 434 includes a second pair of normally open terminals 436 and 438 (C1-C2) connectable to a circulating pump 440 of the zone seen in FIG. 23. As seen in FIG. 22, the module includes a first relay 448 (R1) activated by the call for heat/cold from the signal conductors 202 and 204 seen in FIG. 22, or other thermal control which closes. The first relay so activated is configured to cause the priority relay module to couple power pin 288 and signal pin 292 together, cause the first pair of terminals 306 and 308 to couple together for actuating the boiler 52 seen in FIG. 23 and cause the second pair of terminals 436 and 438 to couple together for actuating the pump 440 seen in FIG. 23.

Thus, power is diverted from the power pin 286 (B) to the signal pin 290 (R), which in turn energizes the bottom two sets of signal conductors 202 and 204. When an end switch or thermal control closes, power returns to the module 434 where it activates the relay between the signal pin 292 (G) and the power pin 288 (W). This closes two sets of normally open terminals T1-T2 and C1-C2. This provides a closed switch for boiler operation plus a pair of closed terminals for a circulating pump or other device.

Figure 23:
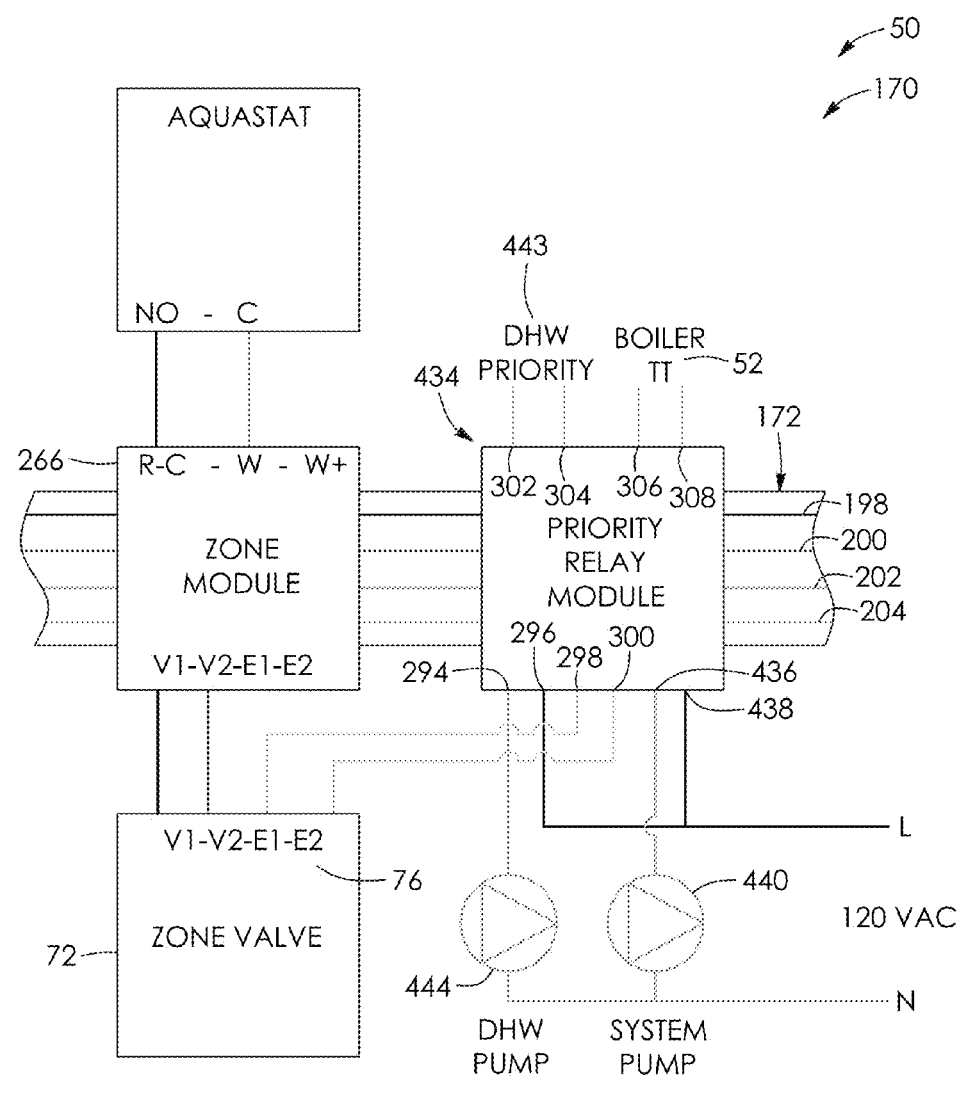
FIG. 23 is a schematic wiring diagram showing an example of how the priority relay module of FIG. 22 may couple to the rest of the system of FIG. 1.

Referring back to FIG. 22, the priority relay module 434 includes a third pair of normally open terminals 302 and 304 connectable to a prioritized terminal, in this case, a domestic hot water tank 443 seen in FIG. 23. As seen in FIG. 22, the priority relay module includes a fourth pair of normally open terminals 294 and 296 connectable to a circulating pump 444 or other device, seen in FIG. 23, for supplying priority heat.

As seen in FIG. 22, the module 434 further includes a second relay 442 (R2) connectable to between terminal 300 and power pin 288 of the module. The second relay 442 (R2) is activated by an external device (thermal or mechanical). The second relay is configured such that when it is activated by the external device, it opens a normally-closed switch 450 associated with first relay 448 (R1), and thereby causes the first pair of terminals 306 and 308 and second pair of terminals 436 and 438 to open and causes the third pair of terminals 302 and 304 and fourth pair of terminals 294 and 296 to close for activating the priority heating 443 and associated pump 444 seen in FIG. 23.

Figure 24:
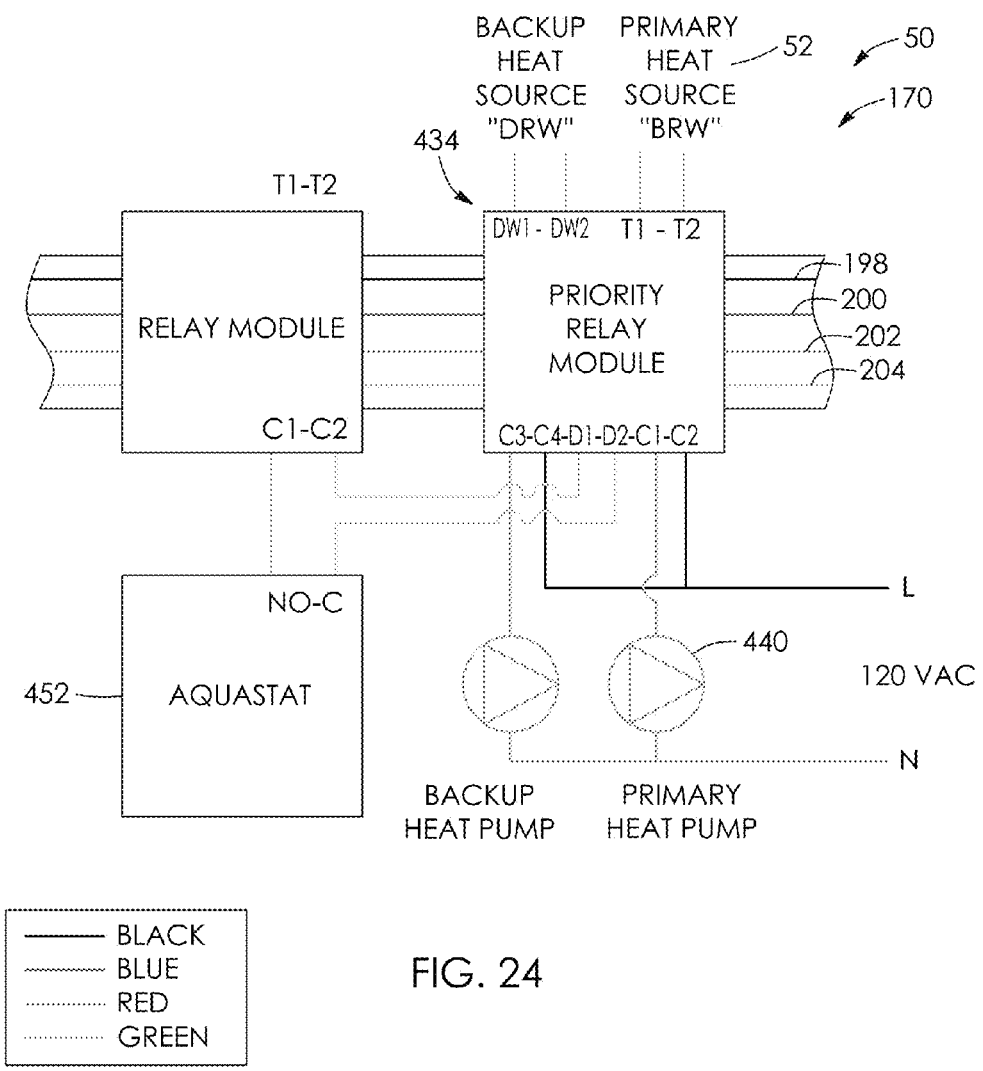
FIG. 24 is a schematic wiring diagram showing another example of how the priority relay module of FIG. 22 may couple to the rest of the system of FIG. 1.

Thus, if a thermal or mechanical switch closes terminals D1-D2, such as via aquastat 452 seen in FIG. 24 or end switch 76 of zone valve 72 in FIG. 23, a second relay 442 seen in FIG. 22 is energized between D2 and the power pin 288 (W). This energized relay (R1) then closes two additional normally open terminals 302 and 304 and 294 and 296 but opens the primary relay 448, de-energizing it and breaking contacts for the primary loads (boiler 52 and pump 440 or other devices seen in FIGS. 23 and 24). The two additional sets of terminals 302 and 304 (DW1-DW2) and 294 and 296 (C3-C4) can then be used for applications such as priority domestic hot water where the boiler's energy is directed solely to hot water production for quicker response and higher volume of hot water. When the priority demand is met, the relay returns to the primary operation. The priority relay module 434 may be suited for applications where a priority for domestic hot water (dhw) is required or where a backup source of heat is provided when a primary source of heat is insufficient.

For a multiple temperature system, the pump module 405 seen in FIG. 16 may be used to separate the terminals for boiler activation from the primary call for heat. Many current boilers are capable of supplying more than one operating temperature. The aquastat on the domestic hot water storage tank provides the call for priority domestic hot water. The associated pump module opens the corresponding zone control valve and sends the closed end switch signal to the priority relay module. This closes terminals for the priority side of the relay and opens the call for heating, providing full boiler focus on delivering quick, high quantity domestic hot water.

As seen in FIG. 25, the modular wiring assembly 170 may further include a hot/cold zone module 454. This is a relay module which is suitable for use in arid climates and places where heat pumps (air-water or ground source) are used to heat water for inflow radiant systems during cooler periods and to circulate cooler water through the same tubing during warmer periods. The module 454 includes a series of electrical conductors, in this example wires, including: wire 344 connecting terminal 302 to power pin 286 (B); wire 359 connecting terminals 306 (W+) and 294 (V1) together; wire 352 connecting terminal 296 (V2) and power pin 288 (W) together; and wire 354 connecting terminal 298 (E1) and signal pin 290 (R) together; wire 346 connecting terminal 308 (C) and power pin 288 (W) together.

The module 454 includes a first relay 361 (R1) interposed between power pin 288 (W) and an additional terminal 363 (Y) of the module. The module includes a second relay 365 (R2) interposed between power pin 288 (W) and terminal 363 (Y) of the module. The relays 361 and 365 are also interposed between terminal 363 and wire 346.

The module has four switches in this example, including a normally closed switch 357 (NCR2) interposed between terminals 304 (W) and 294 (V1), said terminals thus connecting together when the switch is closed. This switch is opened when relay 365 (R2) is energized. A normally open switch 367 (NOR2) is interposed between terminal 294 (V1) and pin 286 (B). Switch 367 is closed to connect terminal 294 and pin 286 together when relay 365 (R2) is energized. A normally closed switch 349 (NCR1) is interposed between terminal 300 (E2) and signal pin 292 (G), thereby connecting terminal 300 and pin 292 together when the switch is in its closed state. Switch 349 is opened when relay 361 (R1) is energized. A normally open switch 351 (NOR1) is interposed between terminals 353 (RC) and 355 (Y). Switch 351 closes when relay 361 (R1) is energized, thereby connecting together terminals 353 and 355.

Figure 26:
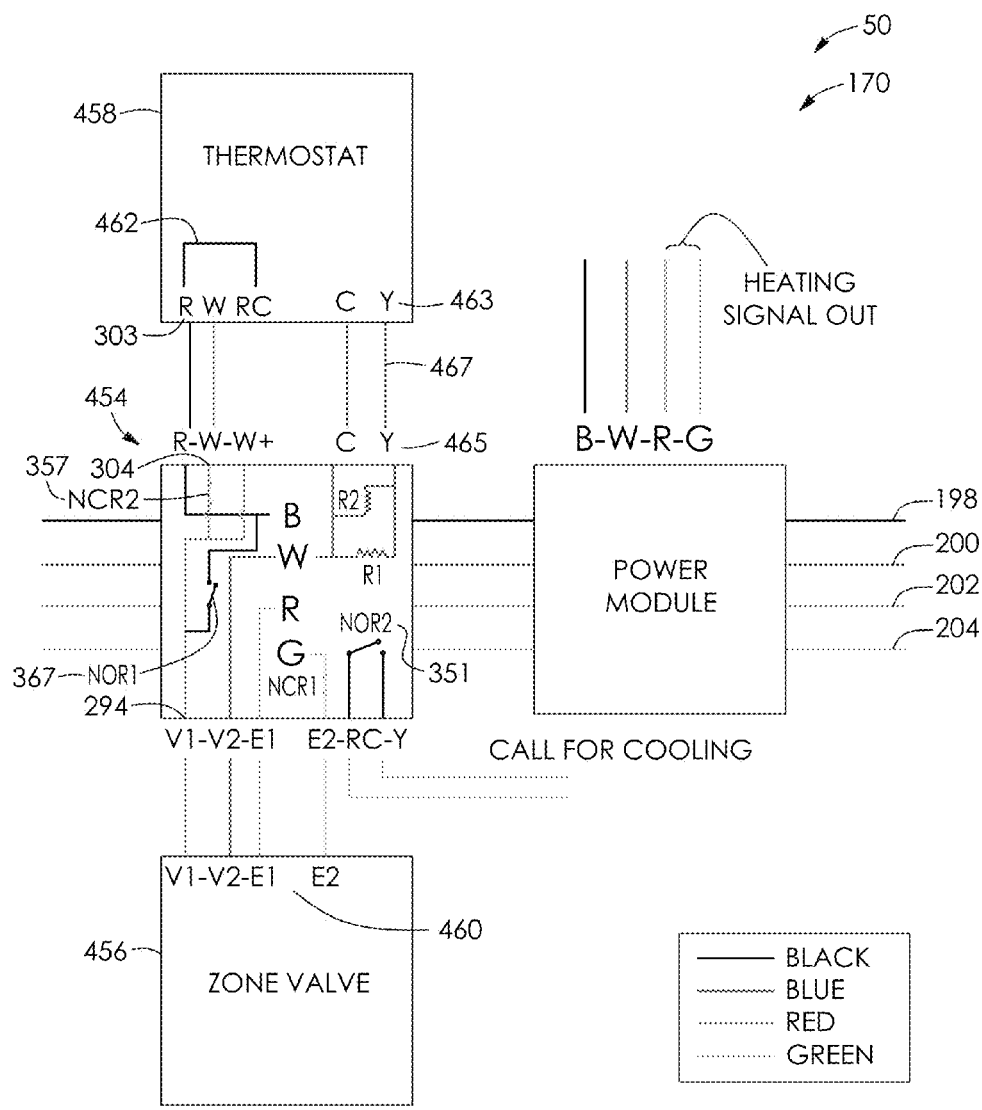
FIG. 26 is a schematic wiring diagram showing an example of how the heat/cool module of FIG. 25 may couple to the rest of the system of FIG. 1.

Under no call for heat or cooling, power is routed from the pin 286 (B) to the terminal 302 (R) and through to the corresponding terminal 303 (R) of the thermostat 458 as seen in FIG. 26.

On a call for heat (fall in temperature), the R-W terminals close in the thermostat and power is routed back to the terminal 304 (W) of the module 454 seen in FIG. 25. As switch 357 is normally closed, power continues to terminal 294 (V1), energizes the zone valve 456. The circuit is completed when power continues to neutral via terminal 296 (V2), wire 352 and pin 288 (W) of the module 454 seen in FIG. 454. Referring back to FIG. 26, when the zone valve 456 fully opens, the valve end switch 460 closes and, as switch 349 is normally closed, signal power is routed from the pin 290 (R) through terminal 298 (E1) through the valve end switch 460 seen in FIG. 26, back through terminal 300 (E2) seen in FIG. 25 and on to the signal pin 292 (G).

Thus, the relays cause the normally closed zone control valve 456 seen in FIG. 26 to open on a call for heat with a thermostat 458 which closes on temperature fall and closes on a call for cooling on temperature rise. End switch contacts are broken on a call for cooling to stop activation of heating when the heat pump is in cooling mode. Switchover between heating and cooling should be manually adjusted. On a call for heat, power is routed from the B pin 286 seen in FIG. 25 to the terminal 302 (R), through the heating contacts of a thermostat capable of heating and cooling. Power is returned to the module 454 on the terminal 304 (W) where it is able to provide power for a zone control valve (or other device) at terminals V1-V2. Referring to FIG. 26, once the zone control valve 456 is open, its end switch 460 completes the signal circuit at terminals E1-E2. This will start the heating side of the heat pump.

For cooling operation a jumper wire 462 should be installed at the thermostat between terminals R-RC which allows power from the transformer module to energize the cooling side of the thermostat. On a call for cooling, power is routed through terminal 463 of the thermostat 458, terminal 465 Y and wire 467 which extends between and connects together the terminals. This will energize two relays 365 and 361 to allow power from the B pin to the V1 terminal and open the zone control valve 456 while breaking contacts on the signal circuit, thereby avoiding a call for heat when the heat pump is in cooling mode. Normally open terminals RC-Y on the bottom of module 454 now close the signal circuit for cooling at the heat pump.

Thus, on a call for cooling (rise in temperature) and referring to FIG. 26, the RC-Y terminals close because of the thermostat jumper wire 462 (R-RC) in the thermostat 458, and power is routed back to the top terminal 363 (Y) of the thermostat. Referring to FIG. 25, this energizes both relay 361 (R1) and relay 365 (R2). The circuit completes as power continues to neutral at the power pin 288 (W). When the two relays are energized, the normally open switches NOR1 (367) and NOR2 (351) close and the normally closed switches NCR1 (349) and NCR2 (357) open, breaking power through those circuits.

When switch 351 (NOR1) closes, power is routed from the pin 286 (B) to terminal 294 (V1). This energizes the zone valve 456 seen in FIG. 26 through terminal 294 (V1) and power then runs to neutral via terminal 296 (V2) of the module pin 288 (W) of the module. Switch NCR2 (357) opening inhibits the chances of R-W being energized during a call for cooling at the thermostat (i.e. with a short). Even when the zone valve 456 is fully open during a call for cooling, and the end switch 460 seen in FIG. 26 closes, the heating will not be activated as switch 349 (NCR1) is now open. Switch 367 (NOR1) closes and is able to energize zone valve 456 through terminal V1. Switch 351 (NOR2) closes and is able to activate the cooling cycle of the heat pump.

When switch 351 (NOR1) closes, power is also routed to terminal 306 (W+). With the normally-closed switch 349 (NCR1) open on a call for cooling, there is still power at W+. This allows additional daisy-chained valves/motors to be powered during heating or cooling. If this was not there, the additional valves would only work in heating mode.

In both heating and cooling, an industry standard normally closed zone valve is opened allowing flow of either heated or cooled fluid. The relays close the necessary circuits to complete the call for heat or cooling while ensuring both cannot run at the same time.

In summary and referring to FIGS. 2A to 2D, 24V power is supplied by the transformer module 222 to the primary track 172. Power is drawn onto the plugs through the B-W pins. The power modules 262, 264 and 320 on the primary track 172 transfer 24V power to power modules 322, 324 and 326 on remote tracks 174, 176 and 178, respectively. 24V is then made available throughout each of the remote tracks on the top two conductors 198 and 200. Power is used by the zone modules 266, 335, 336, 338, 340, 342 and 345 and the two-stage zone module to provide power to each thermostat or aquastat. On a call for heat, power is redirected back to the zone modules where they energize their respective zone control valves. On zones with multiple zone control motors, wire 386 is connected between W+ of a first zone module 338 to W of a second zone module 340.

For zones requiring circulators or fans, the relay module 390 seen in FIG. 14 uses power from the top two conductors 198 and 200 to energize the signal conductors 202 and 204. On a call for heat this energizes the relay and closes normally open contacts for activation of the circulator and boiler. Boiler signal connection is taken from the relay when a relay is used as power source for the end switch must come from the boiler (or other equipment).

Referring back to FIGS. 2A to 2D, an arrangement of modules are thus attached to the tracks 172, 174, 176 and 178 to ensure a trouble free connection of thermal controls (thermostats, aquastats) to associated zone control valves and circulating pumps. Wiring from these "remote" tracks is routed back to the primary track 172 to complete the necessary circuits, which then control operation of the boiler and circulating pumps and other devices and equipment. Due to the modular approach of the controls, the system can be configured in many different ways depending upon the application involved.

The system as herein described is thus directed to a highly modular control and wiring system for use in the multi-zone hydronic heating industry. Hydronic systems are used to distribute hot water in buildings for radiators, in-floor and ceiling mounted radiant heating panels and other hot water heating elements. The modular track wiring assembly as herein described may comprise an easy-to-use control system alleviating many of the installation, service and renovation problems and errors the industry currently experiences.

Figure 27:
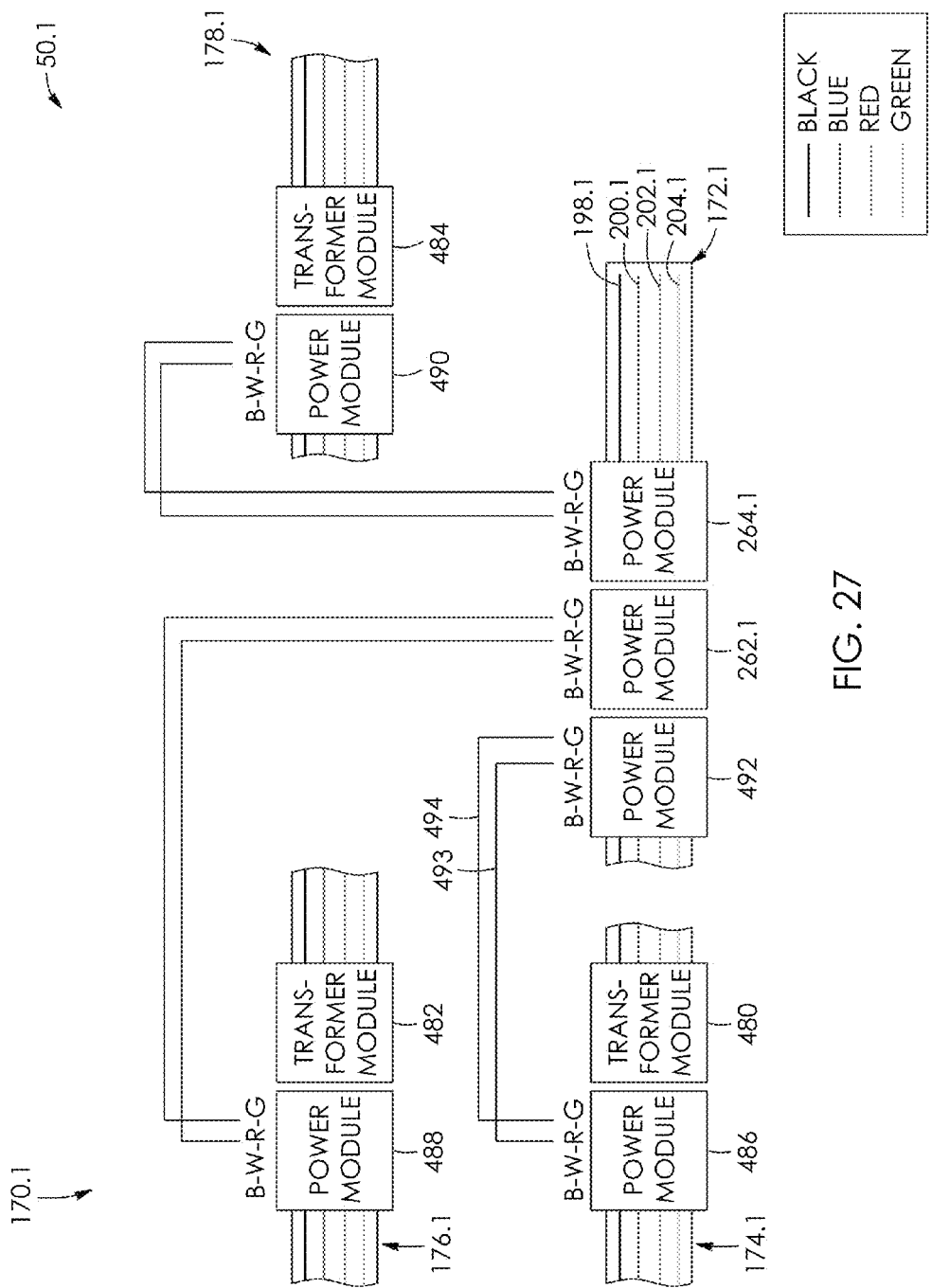
FIG. 27 is a schematic wiring diagram showing an example of how power modules and transformer modules on a plurality of tracks may couple together according to a variation to the wiring of the hydronic system of FIGS. 2A to 2D.

FIG. 27 shows part of a modular wiring assembly 170.1 for a hydronic system 50.1 according to a second aspect. Like parts have like numbers and functions as the modular wiring assembly 170 and system 50 shown in FIGS. 1 to 26 with the addition of decimal extension "0.1". Assembly 170.1 and system 50.1 are substantially the same as assembly 170 and system 50 shown in FIGS. 1 to 26 with the following exceptions.

In this example, assembly 170.1 includes a plurality of transformer modules 480, 482 and 484 coupled to remote tracks 174.1, 176.1 and 178.1, respectively, and which are substantially similar to module 222 seen in FIGS. 2A to 2D. Referring back to FIG. 27, assembly 170.1 further includes a plurality of power modules 486, 488, and 490 coupled to tracks 174.1, 176.1, and 178.1 respective substantially similar to module 262.1. The assembly further includes a plurality of power modules 492, 262.1, and 264.1 configured to couple with power modular 486, 488 and 490, respectively, for connecting the signal conductors 202 and 204 of the tracks 172.1, 174.1, 176.1 and 178.1 together via a series of electrical conductors, in this example wires as seen by wires 493 and 494. In this case, thus, each of the remote tracks has its own remote transformer 480, 482 and 482 for supplying power to its respective power conductors.

Figure 28:
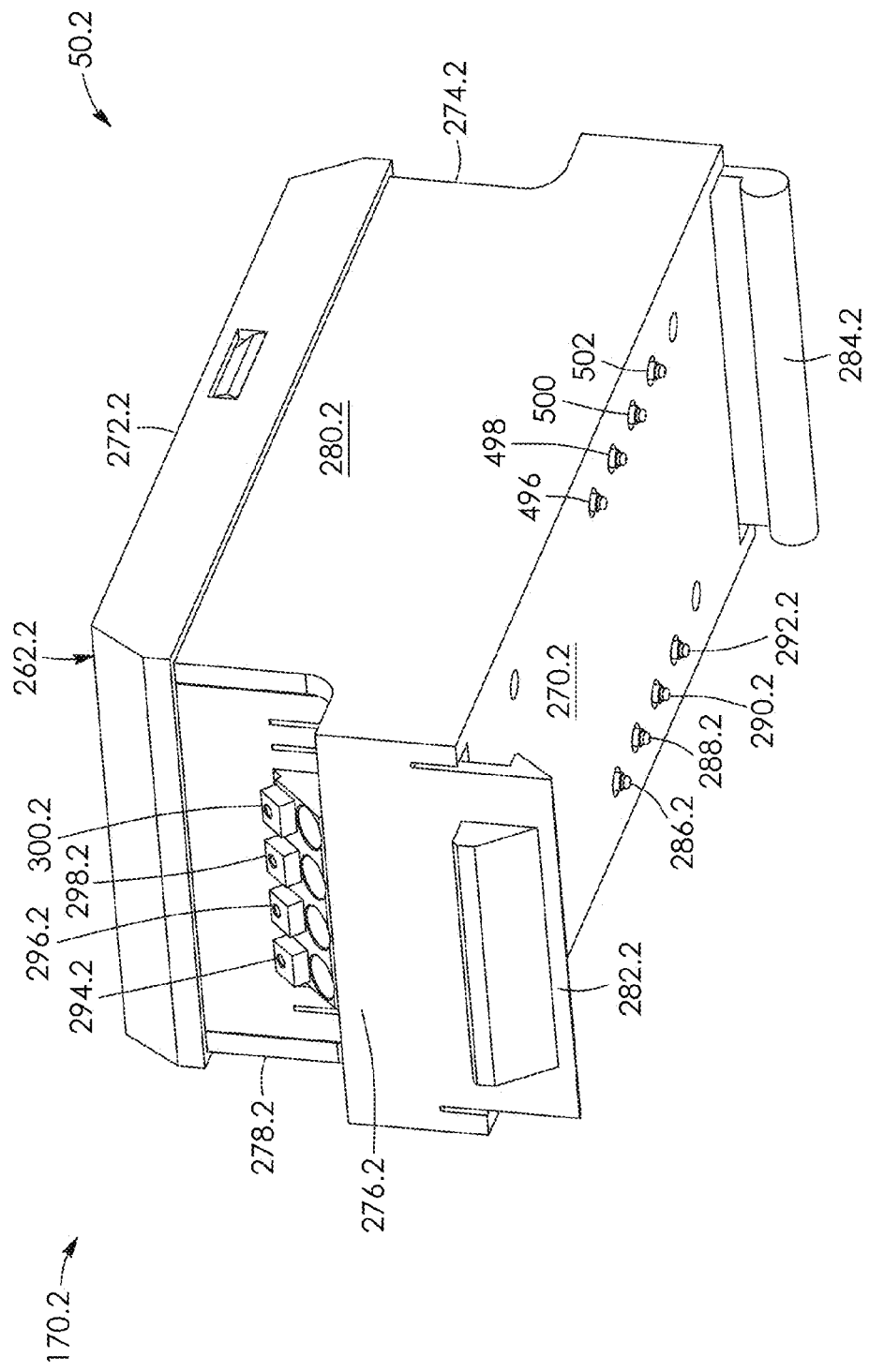
FIG. 28 is a bottom, side perspective view of a power module of a modular track wiring assembly for a hydronic system according to a third aspect.
Figure 29:
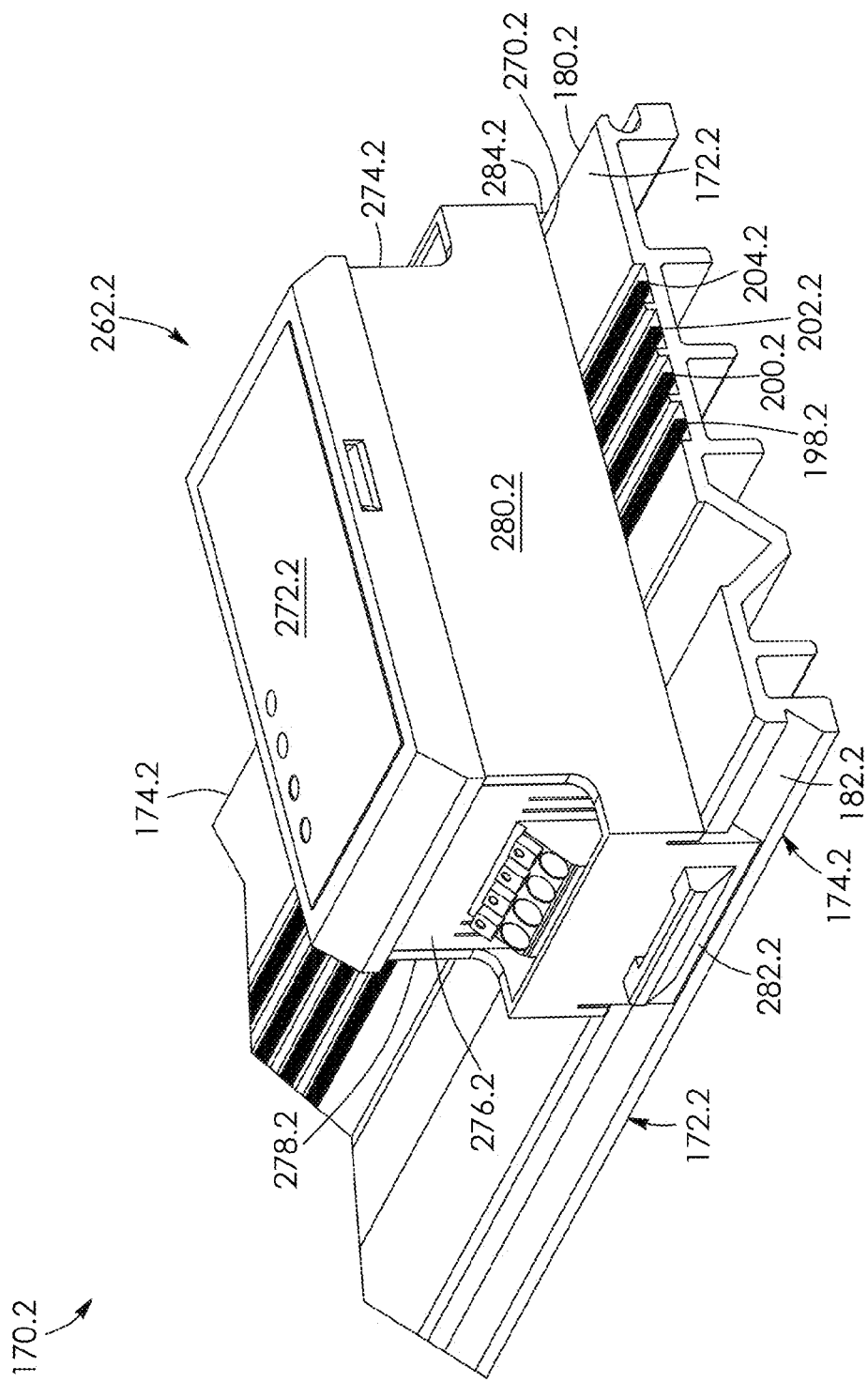
FIG. 29 is a top perspective view of a pair of tracks of the modular track wiring assembly of FIG. 28 with the power module of FIG. 28 coupling the tracks together.

FIGS. 28 and 29 show part of a modular wiring assembly 170.2 for a hydronic system 50.2 according to a third aspect. Like parts have like numbers and functions as the modular wiring assembly 170 and system 50 shown in FIGS. 1 to 26 with the addition of decimal extension "0.2". Assembly 170.2 and system 50.2 are substantially the same as assembly 170 and system 50 shown in FIGS. 1 to 26 with the following exceptions.

Referring to FIG. 28, power modules 262.2 include a first plurality of leads or pins 286.2, 288.2, 290.2 and 292.2 connectable to track 172.2 seen in FIG. 29. The power module includes a second plurality of leads or pins 496, 498, 500 and 502 seen in FIG. 28 connectable to track 174.2 seen in FIG. 29. Pins 286.2, 288.2, 290.2 and 292.2 are electrically coupled to respective ones of pins 496, 498, 500 and 502. Power module 262.2 is thus configured to couple the tracks 172.2 and 174.4 and respective ones of the power and signal conductors 198.2, 200.2, 202.2 and 204.4 of the tracks together. In this manner, the effective length of the track may be extended by joining tracks together by the use of two sets of pins.

The term module as herein described may be replaced by the term plug.

As described above, all of the necessary relay wiring is integral to respective given ones of the modules of the assembly 170 as herein described. Also, the system 50 as herein described does not require any twist on wiring connectors, such as marrettes (trademark), for the installation thereof and may thus be simpler and easier to install compared to existing manners of wiring hydronic systems. The system 50 as herein described may thus inhibit and reduce errors with site wired installations.

The modules of the assembly 170 as herein described may provide the ability to vary each installation to suit a specific system design and function with options to add relays for circulation pumps, priority operation of domestic hot water or functions such as primary and secondary heat sources.

It will be appreciated that many variations are possible within the scope of the invention described herein.

ADDITIONAL DESCRIPTION

Examples of modular wiring assemblies for hydronic systems have been described. The following clauses are offered as further description.
(1) A modular track wiring assembly for a hydronic system having multiple zones, the assembly comprising:
an elongate track including a pair of power conductors extending therealong and configured to supply electrical energy and a pair of signal conductors extending therealong and configured to convey signals; and
a plurality of zone modules connectable to and receiving electrical energy from said track, each of the zone modules being associated with a respective one of the zones and being configured to couple a respective temperature set-point switch of its zone to a respective zone valve of its zone such that said respective zone valve is powered to open upon receiving a valve-actuation signal from said respective temperature set-point switch, and each of the zone modules being configured to couple a respective end switch of the respective zone valve of its zone to said signal conductors for conveying call to a heat/cold signal therealong when said respective zone valve is fully open.
(2) The assembly of clause 1 wherein at least some of the temperature set-point switches are thermostats.
(3) The assembly of any one of clauses 1 and 2 wherein at least some of the temperature set-point switches are aquastats.

It will be understood by someone skilled in the art that many of the details provided above are by way of example only and are not intended to limit the scope of the invention which is to be determined with reference to at least the following claims.

What is claimed is:

1. A modular track wiring assembly for a hydronic system, a first zone thereof including a thermostat which outputs a valve-actuation signal upon the zone temperature deviating from a threshold temperature range and including a zone valve having an end switch which outputs a call for heat/cold signal when the zone valve is fully open, the assembly comprising:
an elongate track including a pair of power conductors extending therealong, the power conductors being configured to supply electrical energy, and the elongate track including a pair of signal conductors extending therealong, the signal conductors being configured to convey signals; and
a zone module connectable to, receiving electrical energy from and moveable anywhere along said track, the zone module including
first and second power pins which selectively couple to respective ones of the power conductors,
first and second signal pins which selectively couple to respective ones of the signal conductors,
a first terminal connectable to a power input terminal of the thermostat, a conductor that electrically couples together the first terminal and the first power pin,
a second terminal connectable to a power output terminal of the thermostat,
a third terminal connectable to an input terminal of a motor of the zone valve, a conductor which connects the second terminal to the third terminal,
a fourth terminal connectable to an output terminal of the motor of the zone valve, a conductor which electrically couples the fourth terminal to the second power pin, the zone module electrically connecting the thermostat to the zone valve such that the zone valve is powered to open upon receiving the valve-actuation signal,
fifth and sixth terminals connectable to respective terminals of the end switch of the zone valve, a conductor which connects the fifth terminal to the first signal pin, and a conductor which connects the sixth terminal to the second signal pin, the zone module connecting the end switch to said signal conductors for conveying the call for heat/cold signal when the zone valve is fully open.

2. The assembly as claimed in claim 1, the hydronic system including an additional zone having a thermostat, a zone valve and an end switch, and wherein the assembly includes an additional zone module connectable to and receiving electrical energy from said track, the additional zone module connecting the thermostat of the additional zone to the zone valve of the additional zone such that the zone valve of the additional zone is powered to open upon receiving a valve-actuation signal from the thermostat of the additional zone, and the additional zone module connecting the end switch of the zone valve of the additional zone to said signal conductors for conveying a call for heat/cold signal therealong when the zone valve of the additional zone is fully open.

3. The assembly as claimed in claim 1, wherein the zone module is a first zone module associated with the first zone, the track is a first track, the system includes a second zone having a thermostat which outputs a valve-actuation signal upon the zone temperature of the second zone deviating from a threshold temperature range of the second zone, the second zone including a zone valve having an end switch which outputs a call for heat/cold signal when the zone valve of the second zone is fully open, and the assembly further includes:
a second zone module substantially the same as the first zone module and being associated with the second zone;
a second track substantially the same as the first track and to which the second zone module is connectable and receives electrical energy therefrom; and
a pair of power modules connectable to each other and to respective ones of the tracks, the power modules being configured to connect respective ones of the power conductors of the tracks together and being configured to connect respective ones of the signal conductors of the tracks together.

4. The assembly as claimed in claim 1, wherein the zone module is a first zone module associated with the first zone, the track is a first track, the system includes a second zone having a thermostat which outputs a valve-actuation signal upon the zone temperature of the second zone deviating from a threshold temperature range of the second zone, the second zone including a zone valve having an end switch which outputs a call for heat/cold signal when the zone valve of the second zone is fully open, and the assembly further includes:
a second zone module substantially the same as the first zone module and being associated with the second zone;

a second track substantially the same as the first track and to which the second zone module is connectable and receives electrical energy therefrom; and a power module having a first plurality of leads connectable to a first of the tracks and a second plurality of leads connectable to a second of the tracks, the second plurality of leads being electrically connected to respective ones of the first plurality of leads, and the power module being configured to connect together the tracks, being configured to connect together respective ones of the power conductors of the tracks and being configured to connect together respective ones of the signal conductors of the tracks.

5. The assembly as claimed in claim 1, the thermostat being a two-stage thermostat which outputs an additional valve-actuation signal should the zone temperature deviate from the threshold temperature range after a set amount of time, the zone including an additional zone valve, and wherein the zone module is a two-stage zone module configured to connect the thermostat to the additional zone valve such that the additional zone valve is powered to open upon receiving the additional valve-actuation signal.

6. The assembly as claimed in claim 1, the thermostat being a two-stage thermostat which outputs a call for additional heating/cooling signal should the zone temperature deviate from the threshold temperature range after a set amount of time, and wherein the zone module is a two-stage zone module configured to energize a relay for operating an additional heating/cooling unit upon receiving the additional heating/cooling signal.

7. The assembly as claimed in claim 1, further including a relay module selectively connectable to said track, the relay module including a first pair of normally open terminals connectable to a heat/cold source of the system, a second pair of normally open terminals connectable to a circulating pump of the zone, and a relay activated by the call for heat/cold signal, the relay so activated being configured to cause the relay module to connect respective ones of the power conductors to respective ones of the signal conductors, causing said first pair of terminals to connect together for activating the heat/cold source and causing said second pair of terminals to connect together for actuating the circulating pump.

8. The assembly as claimed in claim 1, the hydronic system having a priority zone and a prioritized circulating pump, and the assembly further including a priority relay module selectively connectable to said track, the relay module including a first pair of normally open terminals connectable to a primary heat/cold source of the system, a second pair of normally open terminals connectable to a circulating pump of the zone, a third pair of normally open terminals connectable to a backup heat/cold source of the system, a fourth pair of normally open terminals connectable to the prioritized circulating pump of the priority zone, a first relay activated by the call for heat/cold signal, the first relay so activated being configured to cause the priority relay module to connect respective ones of the power conductors to respective ones of the signal conductors, cause said first pair of terminals to connect together for actuating the primary heat/cold source and cause said second pair of terminals to connect together for actuating the pump, and a second relay activated by an external device of the system, the second relay so activated being configured to cause the first pair and the second pair of terminals to open and cause the third pair and the fourth pair of terminals to close for activating the backup heat/cold source.

9. The assembly as claimed in claim 1, further including a transformer module connectable to said track, the transformer module being connectable to a high voltage source and including a transformer, the transformer being configured to transform a high input voltage from the high voltage source to a low output voltage and supply the power conductors of the track with electrical energy having the low output voltage thereafter.

* * * * *